(12) United States Patent
Ballou et al.

(10) Patent No.: US 9,189,508 B2
(45) Date of Patent: Nov. 17, 2015

(54) INFERRING RELEVANCE BASED ON USER INTERACTIONS WITH EMAIL

(71) Applicant: Tipbit Inc., Bellevue, WA (US)

(72) Inventors: Nathaniel Harper Ballou, Kirkland, WA (US); Gordon John Mangione, Kirkland, WA (US); Ewan Ellis Mellor, San Francisco, CA (US)

(73) Assignee: Tipbit Inc., Bellevue, WA (US)

( * ) Notice: Subject to any disclaimer, the term of this patent is extended or adjusted under 35 U.S.C. 154(b) by 0 days.

(21) Appl. No.: 13/946,801

(22) Filed: Jul. 19, 2013

(65) Prior Publication Data
US 2015/0026187 A1    Jan. 22, 2015

(51) Int. Cl.
*G06F 17/30* (2006.01)
*G06F 15/16* (2006.01)

(52) U.S. Cl.
CPC ............................... *G06F 17/30321* (2013.01)

(58) Field of Classification Search
USPC ........................................................ 707/741
See application file for complete search history.

(56) References Cited

U.S. PATENT DOCUMENTS

| | | | |
|---|---|---|---|
| 2006/0080303 A1* | 4/2006 | Sargent et al. | 707/3 |
| 2008/0235204 A1* | 9/2008 | Dai et al. | 707/5 |
| 2010/0318569 A1* | 12/2010 | Munday | 707/783 |
| 2012/0150839 A1* | 6/2012 | Sundelin et al. | 707/711 |
| 2013/0159298 A1* | 6/2013 | Mason et al. | 707/728 |

* cited by examiner

*Primary Examiner* — Alex Gofman
(74) *Attorney, Agent, or Firm* — John W. Branch; Lowe Graham Jones PLLC

(57) ABSTRACT

Embodiments are directed towards employing an index of relevant items to determine and provide items that are relevant to a query. A data store that includes a plurality of items may be generated for each user. The user data store may be employed to generate an index of relevant items for each user. Relevant items may be pre-ranked in the index based on a degree of relevancy to a corresponding item. The index of relevant items may be employed to determine ranked relevant items associated with at least one item associated with a query. In response to the query, the relevant items may be further ranked or re-ranked based on at least a current time of the query and a time decay function associated the relevant items. A subset of the determined ranked relevant items may be provided to a client device for display to the user.

30 Claims, 13 Drawing Sheets

INFERRING RELEVANCE BASED ON USER INTERACTIONS WITH EMAIL

TECHNICAL FIELD

The present invention relates generally to personal information management, and more particularly, but not exclusively, to generating an index of relevant items to determine and provide items that are relevant to a query.

BACKGROUND

Today, people often utilize many different computing tools to manage personal information, communicate with others, manage meetings and tasks, and the like. Examples of such computing tools may include, but are not limited to, email, text messaging, instant messaging, calendaring tools, document management tools, address books, social media tools, other personal information managers, or the like. Sometimes, information from different computing tools may be related or relevant to each other, with or without the user's knowledge. In some instances a user may want to quickly access and/or share this relevant information with others. However, the user may have to perform multiple actions and/or separately access each computing tool to locate and/or access the related/relevant information.

For example, a person may want to forward an email about an upcoming meeting to others who are invited to the meeting. The person may have to open their calendar and locate the meeting entry. From here the user may have to write down the name of the meeting attendees. The person may then have to access their contacts list to obtain each attendee's email address from which the email can be forwarded. These additional steps to determine, locate, and/or access related/relevant information can lead to missing information, wasting time, user frustration, and the like. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
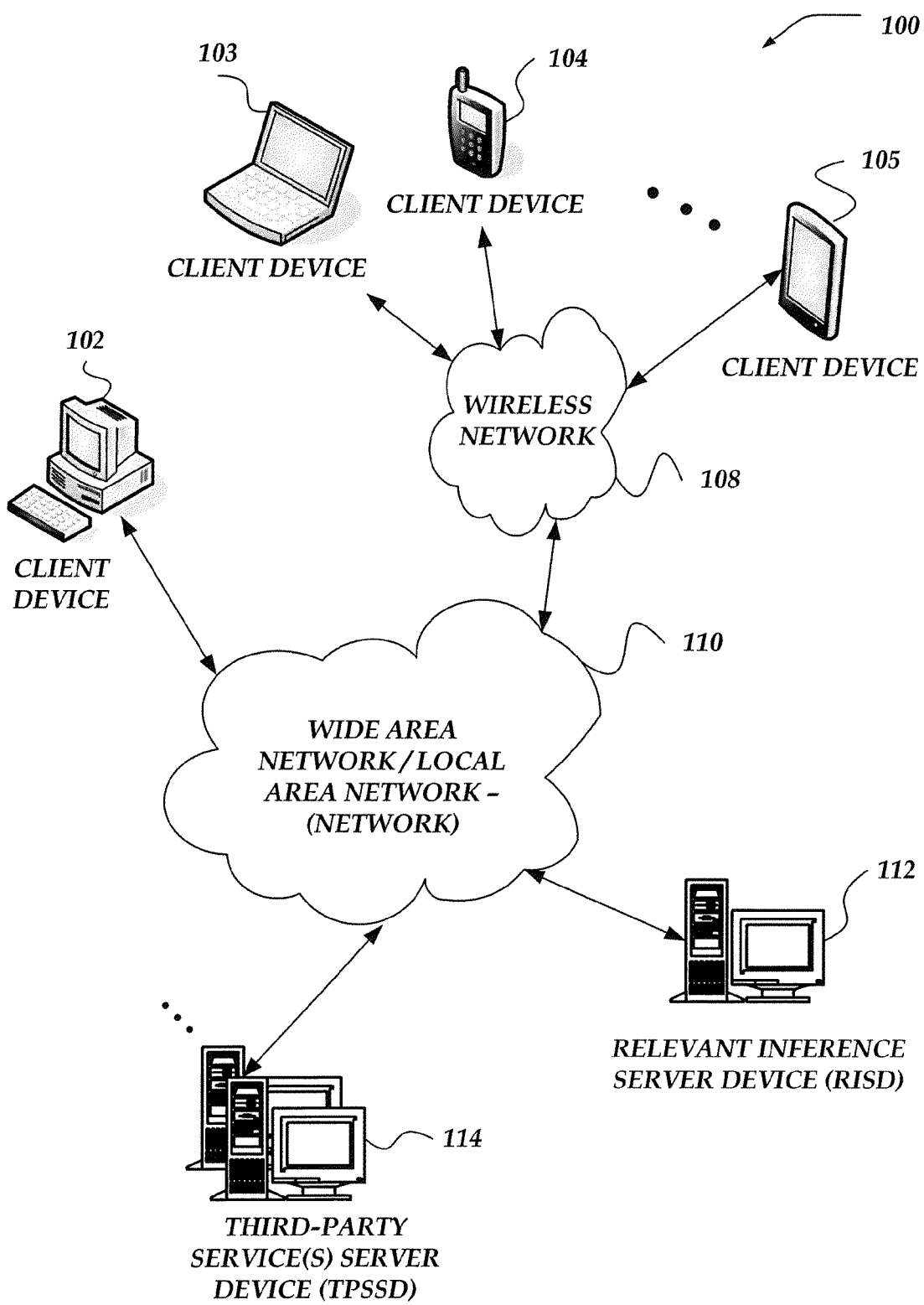
FIG. 1 is a system diagram of an environment in which embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "item" may refer to information and/or data associated with a user. In some embodiments, items may include the user's content, which can include, but is not limited to contacts, documents, emails, calendar entries, tasks, events, appointments, other personal information management data, instant messages, text messages, social media information, or the like.

As used herein, the terms "behavior" and/or "user behavior" may refer to actions performed by a user on one or more items. In some embodiments, user behaviors may be monitored and/or tracked based on input and/or selections by a user. Examples of user behaviors may include, but are not limited to, moving an email from one folder to another folder, opening an email, an order of opening new emails, responding to emails, creating a calendar entry after viewing an email, sending an email while another document is open and/or being edited, or the like.

As used herein, the phrase "user data" may refer to items and/or user behaviors that are associated with a user. User data may be tracked, maintained, managed, and/or stored for each of a plurality of users. In some embodiments, the user data for each separate user may be stored separately. In other embodiments, user data for a plurality of users may be stored together (e.g., in a generic user data store). In various embodiments, user data (e.g., items and/or user behaviors) may be crawled from one or more client devices, third party services, or the like.

As used herein, the phrase "personal information manager," or "PIM," may refer to an application, program, or other computer software—executing on a client device, executing on a remote network device, or web-based—that functions as a personal organizer for items. Although described as software, it should be understood that the functionality of a PIM may also be implemented in hardware or a combination of hardware and software.

As used herein, the phrase "relevant inference client," or "RIC," may refer to a PIM executing on a client device that is configured to communicate with a relevant inference engine. In some embodiments, a relevant inference client may be a stand-alone application executing on a client device (e.g., a mobile application executing on a mobile phone). In other embodiments, a relevant inference client may be an add-in and/or component of another application that is executing on a client device.

As used herein, the phrase "relevant inference engine," or "RIE," may refer to software, hardware, or a combination of software and hardware, that may be configured to determine and/or manage user data stores and indexes of relevant items for a plurality of users. In some embodiments, the RIE may be configured to provide ranked relevant items to a user in response to a query.

As used herein, the phrase "third-party services" may refer services utilized by users of client devices, which may store and/or maintain information separate and/or distinct from the client devices. Examples of third-party services may include, but are not limited to, personal information manager services, web-based email services, storage services, social media services, and the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to employing an index of relevant items to determine and provide items that are relevant to a query. A data store may be generated for a user that includes a plurality of items for the user. In some embodiments, a separate data store may be generated for each of a plurality of users. In at least one of various embodiments, a user data store may be generated by crawling at least one client device that is associated with the user and/or at least one third-party service for the user's items and/or behaviors. A relevancy between each of the plurality of items in the data store may be determined, which in some embodiments may be based on user behaviors.

The user data store may be employed to generate an index for the plurality of items based on at least the determined relevancies. In some embodiments, a separate index may be generated for each of a plurality of users based on a corresponding user data store. In various embodiments, each indexed item may be associated with other indexed items that are relevant to a corresponding indexed item. In at least one embodiment, a ranked order of the other indexed items may be determined for each indexed item, which, in some embodiments, may be determined independent of a query. In various embodiments, the other indexed items may be rank ordered based on at least a degree of relevancy that the other indexed items have to a corresponding indexed item.

In some embodiments, a query may be provided for items that are relevant to at least one indexed item for the user. The index for the user may be employed to determine one or more other indexed items that are relevant to the at least one item. In some embodiments, the query may be employed to determine the at least one indexed item, and the other indexed items that are relevant to the determined at least one indexed item may be rank ordered. In at least one of various embodiments, this ranking may be determined based on a comparison of a current time of the query and a time decay function associated with the other indexed items.

In various embodiments, a subset of the determined ranked indexed items may be provided to a client device for display to the user. In some embodiments, the data store and the index may be updated based on new or modified items. In other embodiments, the data store and the index may be updated based on user feedback associated with the ranked indexed items that were provided for display to the user.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs) (network) 110, wireless network 108, client devices 102-105, Relevant Inference Server Device (RISD) 112, and Third-Party Service(s) Server Device (TPSSD) 114.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WML-Script, JavaScript, Standard Generalized Markup Language (SGML), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, RISD 112, TPSSD 114, or other computing devices.

Client devices 102-105 may further be configured to include a client application that enables an end-user to log into an end-user account that may be managed by another computing device, such as RISD 112, TPSSD 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Telin Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, RISD 112, TPSSD 114, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of RISD 112 is described in more detail below in conjunction with FIG. 3. Briefly, however, RISD 112 includes virtually any network device capable of generating an index of relevant items for users and providing ranked relevant items to a user in response to a query. In at least one embodiment, RISD 112 may crawl client devices 102-105 and/or TPSSD 114 for items and/or user behaviors to generate data stores for users. Devices that may be arranged to operate as RISD 112 include various network devices, including, but not limited to personal computers, desktop computers, multiprocessor systems, microprocessor-based or programmable consumer electronics, network PCs, server devices, network appliances, and the like.

Although FIG. 1 illustrates RISD 112 as a single computing device, the invention is not so limited. For example, one or more functions of the RISD 112 may be distributed across one or more distinct network devices. Moreover, RISD 112 is not limited to a particular configuration. Thus, in one embodiment, RISD 112 may contain a plurality of network devices. In another embodiment, RISD 112 may contain a plurality of network devices that operate using a master/slave approach, where one of the plurality of network devices of RISD 112 operates to manage and/or otherwise coordinate operations of the other network devices. In other embodiments, the RISD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of TPSSD 114 is described in more detail below in conjunction with FIG. 3. Briefly, however, TPSSD 114 includes virtually any network device capable of providing third-party services to users of client devices 102-105. TPSSD 114 may include, but is not limited to, personal information manager services, web-based email services, storage services, social media services, or the like. Devices that may be arranged to operate as TPSSD 114 include various network devices, including, but not limited to personal computers, desktop computers, multiprocessor systems, microprocessor-based or programmable consumer electronics, network PCs, server devices, network appliances, and the like.

Although FIG. 1 illustrates TPSSD 114 as a single computing device, the invention is not so limited. For example, one or more functions of the TPSSD 114 may be distributed across one or more distinct network devices. Moreover, TPSSD 114 is not limited to a particular configuration. Thus, in one embodiment, TPSSD 114 may contain a plurality of network devices. In another embodiment, TPSSD 114 may contain a plurality of network devices that operate using a master/slave approach, where one of the plurality of network devices of TPSSD 114 operates to manage and/or otherwise coordinate operations of the other network devices. In other embodiments, the TPSSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
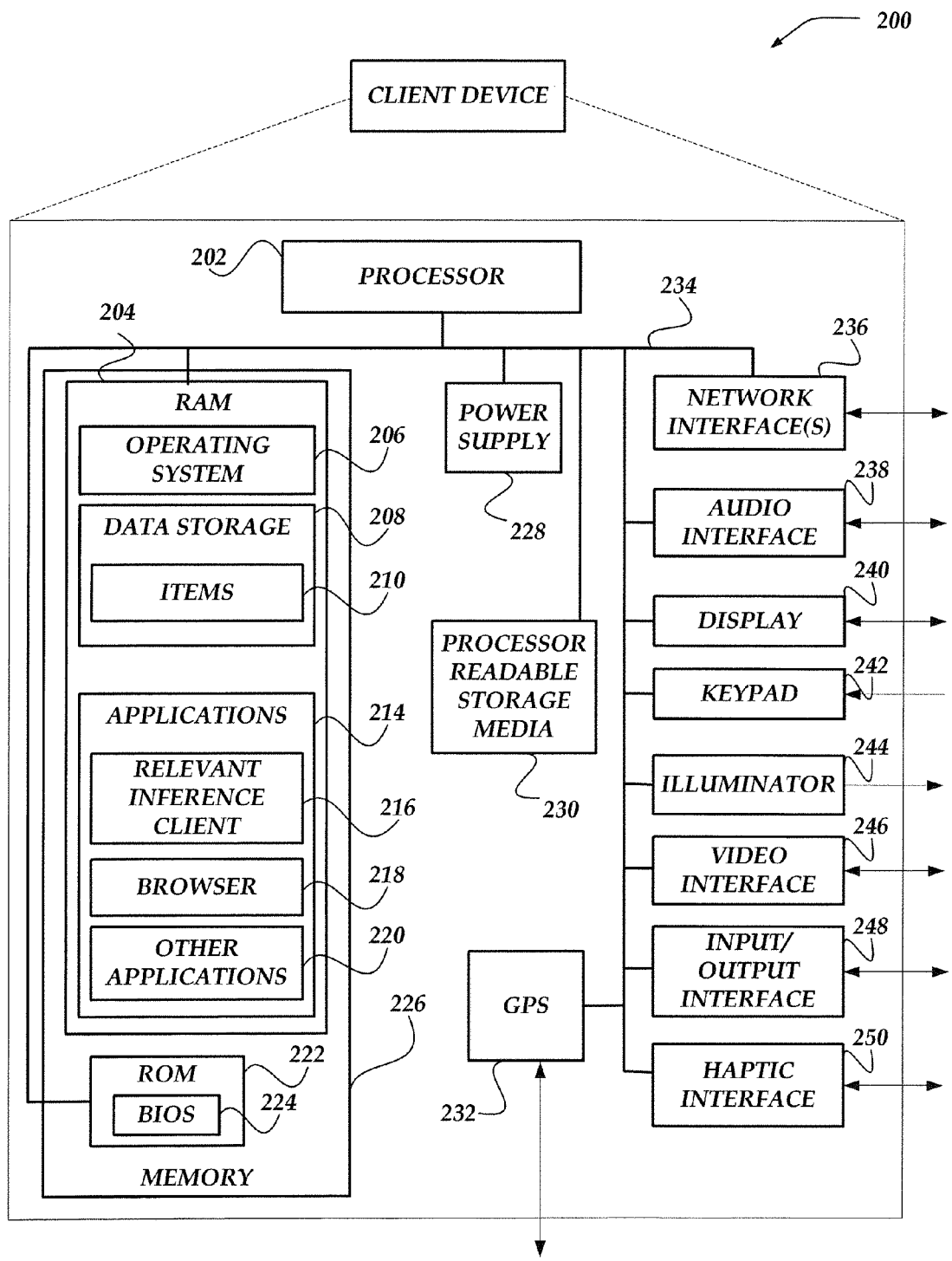
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. Data storage 208 may, in some embodiments, store items 210. Items 210 may include items associated with a user of client device 200. In various embodiments, items 210 may be crawled by other computing devices, such as, but not limited to, RISD 112 of FIG. 1. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, relevant inference client 216, browser 218, and other applications 220.

Relevant inference client 216 may be a personal information manager application. In some embodiments, relevant inference client 216 may be a stand-alone application (e.g., a mobile phone application), an add-in and/or component of another application, or the like. In various embodiments, relevant inference client 216 may be enabled to communicate with RISD 112 of FIG. 1 to provide items 210 for storage in data store for the user of client device 200. In at least one of various embodiments, relevant inference client 216 may be configured to enable a user to provide a query for relevant items (e.g., enabling a user to select an item and providing an item identifier of the selected to RISD 112 of FIG. 1). Relevant inference client 216 may be configured to display results of the query to the user (e.g., a three highest ranked items that are relevant to the selected item).

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as TPSSD 114 of FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Illustrative Network Device

Figure 3:
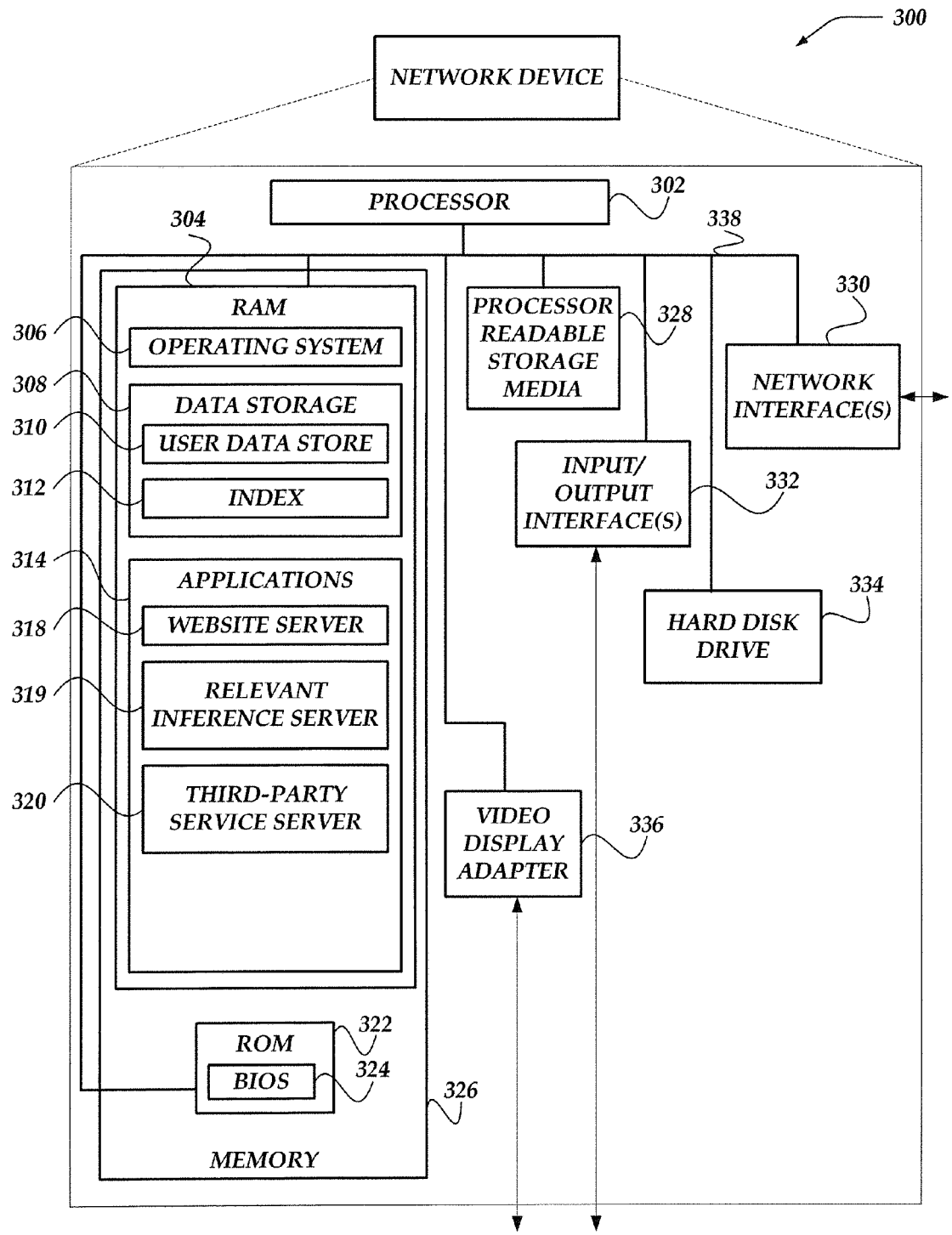
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example RISD 112 and/or TPSSD 114 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Data storage 308 may include user data store 310 and/or index 312. User data store 310 may include a plurality of user data stores for a plurality of different users (e.g., individual user data stores). In some embodiments, user data store 310 may include a generic data store that may be utilized to generate a generic index of relevant items for the plurality of users. Each user data store in user data store 310 may include a plurality of items and/or user behaviors that are associated with user that corresponds to the data store.

Index 312 may include a plurality of indexes of relevant items for a plurality of different users (e.g., individual indexes). In some embodiments, index 312 may include a generic index of relevant items that may be utilized to determine ranked relevant items across the plurality of users in response to a query by a user. Index 312 for a user may include an entry for each item in user data store 310 for that user) and s those items that are relevant to the entry. In some embodiments, the relevant items for an entry may be pre-ranked based on a degree of relevancy to the entry item.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, Relevant Inference Server 319, and Third-Party Service Server 320.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Relevant Inference Server 319 may be configured to generate an index of relevant items for users and providing ranked relevant items to a user in response to a query. In at least one embodiment, Relevant Inference Server 319 may be configured to communicate with relevant inference client 216 of FIG. 2 to crawl client devices 102-105 to user's items and/or behaviors, receive a query for relevant items, and/or provide a subset of ranked relevant items for display to the user. In other embodiments, Relevant Inference Server 319 may be configured to communicate with TPSSD 114 of FIG. 1 to crawl for items and/or user behaviors to generate data stores for users. In some embodiments, Relevant Inference Server 319 may be employed by RISD 112 of FIG. 1. In any event, Relevant Inference Server 319 may employ processes, or parts of processes, similar to those described in conjunction with FIGS. 5-9, to perform at least some of its actions.

Third-Party Service Server 320 may be configured to provide third-party services to users of client device 200 of FIG. 2, such as, but not limited to, personal information manager services, web-based email services, storage services, social media services, or the like. In some embodiments, Third- Party Service Server 320 may be employed by TPSSD 114 of FIG. 1. In any event, Third-Party Service Server 320 may employ processes, or parts of processes, similar to those described in conjunction with FIGS. 5-9, to perform at least some of its actions.

System Overview

Figure 4:
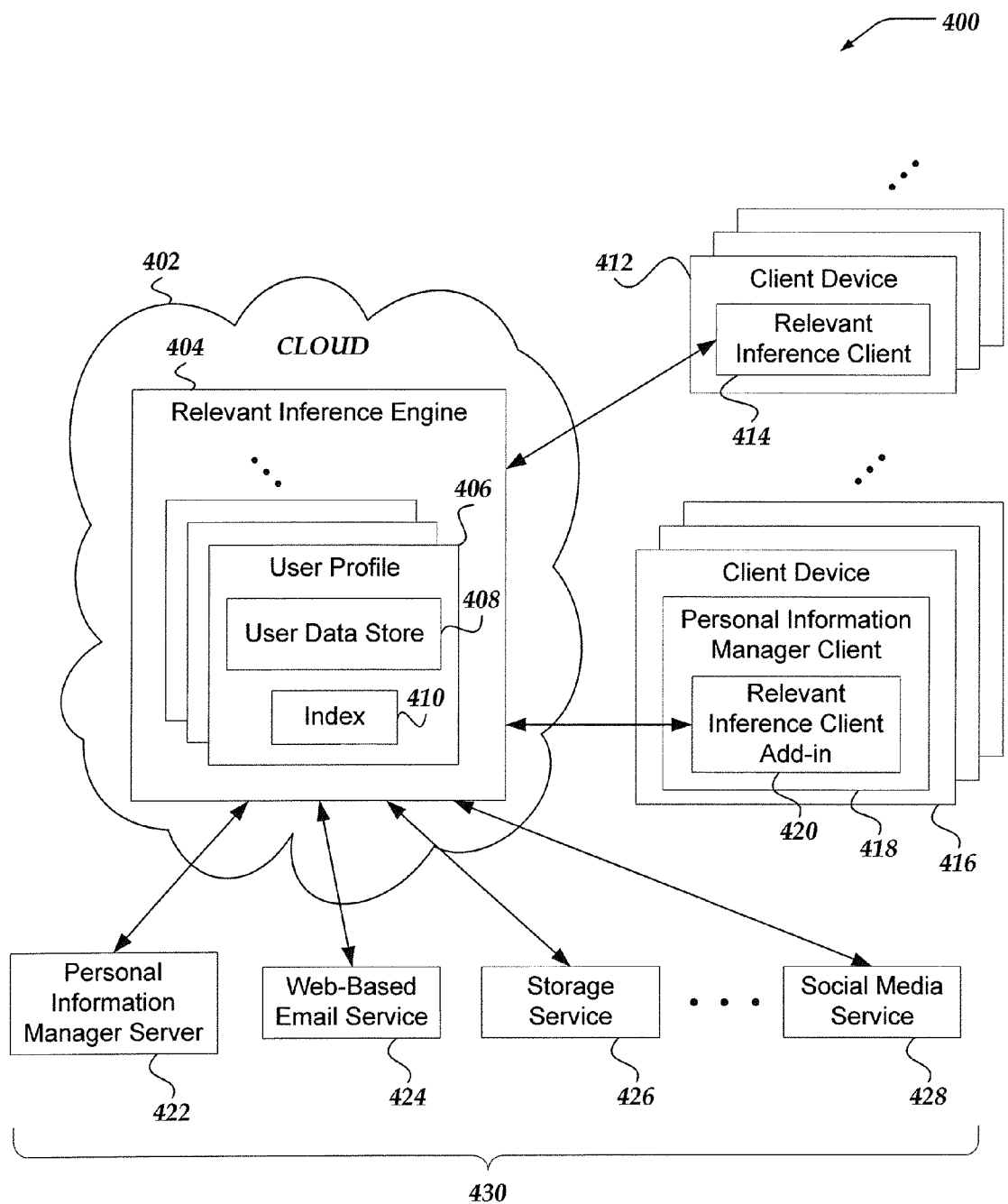
FIG. 4 shows an overview system diagram generally showing embodiments of a relevant inference engine in communication with client devices and third-party services.

FIG. 4 shows an overview system diagram generally showing embodiments of a relevant inference engine in communication with client devices and third-party services. System 400 may include Relevant Inference Engine (RIE) 404, client devices 412, client devices 416, and third-party services 430. In some embodiments, RIE 404 may be executed on and/or employed in cloud computing resources (e.g., cloud 402). In at least one of various embodiments, one or more computing devices, such as network device 300 of FIG. 3 may be employed to perform at least some of the functions of RIE 404.

RIE 404 may be configured to generate, maintain, manage, and/or store user profiles, user data stores, and/or indexes. RIE 404 may include a plurality of user profiles (which may include user profile 406). Each separate user profile may correspond to different users, such that each user may have a corresponding user profile 406. User profile 406 may include user data store 408 and/or index 410. User data store 408 may store a plurality of items and/or a plurality of user behaviors associated with a corresponding user of profile 406. In some embodiments, user data store 408 may be generated by employing embodiments described below in conjunction with FIG. 6. Index 410 may be an index of relevant items for the corresponding user of profile 406. In some embodiments, index 410 may be generated by employing embodiments described below in conjunction with FIG. 7.

Since RIE 404 may maintain a plurality of user profiles, RIE 404 may maintain a plurality of user data stores and a plurality of indexes, where each user data store and/or index may correspond to a separate and/or different user. However, embodiments are not so limited and in other embodiments, profiles, user data stores, and/or indexes may be associated with a plurality of users (e.g., as a generic user data store or a generic index).

In some embodiments, a user profile (e.g., user profile 406) may be maintained for a user for a plurality of different client devices, such as client devices 412 and/or 416. In various embodiments, at least a portion of the user data store and/or the index of relevant items for the user may be generated from items and/or user behaviors crawled from one or more client devices. In other embodiments, the user may be enabled to query RIE 404 for ranked relevant items from different client devices or from a client device that is different from the client device that was crawled for the items/behaviors. For example, a user data store and index of relevant items may be generated for a user by crawling the user's desktop computer. The user may subsequently provide a query for relevant items and/or view the results on the user's mobile device.

In some embodiments, RIE 404 may be configured to communicate with client devices 412, client devices 416, and/or third-party services 430. In some embodiments, RIE 404 may crawl client devices 412, client devices 416, and/or third-party services 430 for items and/or behaviors associated with one or more users. RIE 404 may store the crawled items/behaviors in user data store 408 for a corresponding user. In various embodiments, RIE 404 may be configured to generate index 410 from user data store 408, as described herein. In other embodiments, RIE 404 may receive a query for relevant items from a client device (e.g., client device 412 or 416), determine one or more ranked relevant items, and provide at least a subset of the ranked relevant items to the requesting client device for display.

Client device 412 may be an embodiment of client device 200 of FIG. 2. In some embodiments, system 400 may include a plurality of client devices 412. Client device 412 may include Relevant Inference Client (RIC) 414. In some embodiments, RIC 414 may be a personal information manager application that is executing on client device 412. In at least one such embodiment, client device 412 may be a mobile device and RIC 414 may be a mobile application that is downloaded to and/or accessible via client device 412. RIC 414 may be enabled to communicate with RIE 404. In at least one of various embodiments, RIC 414 may be configured to crawl client device 412 for items and/or user behaviors. RIC 414 may provide copies and/or identifiers (e.g., links, pointers, or the like) of items to RIE 404 for storage in user data store 408 for a corresponding user. In some other embodiments, RIC 414 may be configured to enable a user to provide a query for relevant items and may enable the display of the results of the query on client device 412.

Client device 416 may be an embodiment of client device 200 of FIG. 2. In some embodiments, system 400 may include a plurality of client devices 416. In at least one of various embodiments, client device 416 may be an alternative embodiment and/or employ embodiments of client device 412. Client device 416 may include Relevant Inference Client Add-in (RIC add-in) 420. In some embodiments, RIC add-in 420 may be an add-in, plug-in, component, or other modification/addition to another application. For example, as illustrated RIC add-in 420 may be a component of personal information manager client 418, which may be executing on client device 416. In some embodiments, RIC add-in 420 may employ embodiments similar to relevant inference client 414 for crawling client device 416 and/or providing a query for relevant items and enabling client device 416 to display the results of the query.

In some embodiments, client device 416 may differ from client device 412 in how the relevant inference client is executing on the client device. For example, RIC 414 may be executing on client device 412 as a stand-alone application, whereas RIC add-in 420 may be executing as a component of another application (e.g., personal information manager client 418) that is executing on client device 416.

Third-party services 430 may be services utilized by users of client devices 412 and/or client devices 416, which may store and/or maintain information separate and distinct from the client devices. In some embodiments, RIE 404 may be configured to crawl third-party services 430 for items and/or user behaviors associated with users of client devices 412 and/or 416. In at least one of various embodiments, RIE 404 may download copies of crawled items from third-party services 430. In some other embodiments, RIE 404 may not download copies of items from a third-party services—such as if a third-party service prohibits the crawling and downloading of items (e.g., some social media services prohibit such activity). In at least one such embodiment, RIE 404 may determine and store links and/or references to items maintained by such third-party services.

Examples of third-party services 430 may include, but are not limited to, personal information manager server 422, web-based email service 424, storage service 426, and social media service 428. Personal information manager server 422 may be the service and/or hosting servers that store emails, contacts, calendar information, or the like, of personal information manager client 418. Web-based email service 424 may include email hosting services that may be accessed via the interne through a web browser. Storage service 426 may include web-based storage hosting services, which may include, but is not limited to, private cloud storage, remote storage, shared storage, or the like. Social media services 428 may include services that enable users to post content, maintain personal information pages, communicate/share content with others, or the like. Personal information manager server 422, web-based email service 424 storage service 426, and social media service 428 are examples of third-party services 430, and should be construed as limiting; but rather, third-party services 430 may include other services that may be utilized by RIE 404 to obtain items and/or user behaviors associated with one or more users that may be utilized to generate a user data store 408 for each user.

The following is a brief example of employing system 400 with embodiments described herein. As items are provided to RIE 404 (e.g., by crawling client devices 412, client devices 416, third-party services 430, or the like), an item identifier may be determined for each item. In some embodiments, the item identifier may be included as metadata of the item. For example, an email may be received by personal information manager server 422. RIE 404 may crawl personal information manager server 422 to obtain the received email. RIE 404 may store a copy of the received email in user data store 408 and may update index 410 (and the ranked relevant items) based on user data store 408 (as updated with the received email).

A user may initialize execution of RIC 414 on client device 412. RIC 414 may synchronize with personal information manager server 422 and/or RIE 404 to obtain current personal information manager data (e.g., user's emails, calendar entries, or the like). RIC 414 may enable client device 412 to display one or more emails to the user. In some embodiments, RIC 414 may enable the user to select one or more of the displayed emails. RIC 414 may determine an item identifier for the email (e.g., by obtaining the item identifier from the selected email's metadata). RIC 414 may provide the item identifier for the selected item to RIE 404 as a query for relevant items. RIE 404 may employ index 410 (of user profile 406 that corresponds to the user) to determine one or more items that are relevant to the selected email (e.g., the provided item identifier). In some embodiments, the relevant items may be pre-ranked in index 410. In at least one of various embodiments, RIE 404 may re-rank and/or modify the ranked relevant items based on a current time/time decay of items, other item metadata, or the like. In any event, RIE 404 may provide at least a subset of the ranked relevant items to RIC 414 for display to the user. It should be recognized that this example is for illustration purposes and should not be construed as exhaustive or limiting; but rather, system 400 may employ other embodiments and/or combinations of embodiments described herein.

General Operation

The operation of certain aspects of the invention will now be described with respect to FIGS. 5-9. In at least one of various embodiments, processes 500, 600, 700, 800, and 900 described in conjunction with FIGS. 5-9, respectively, may be implemented by and/or executed on a single network device, such as network device 300 of FIG. 3. In other embodiments, these processes or portions of these processes may be implemented by and/or executed on a plurality of network devices, such as network device 300 of FIG. 3. However, embodiments are not so limited and various combinations of network devices, or the like, may be utilized.

Figure 5:
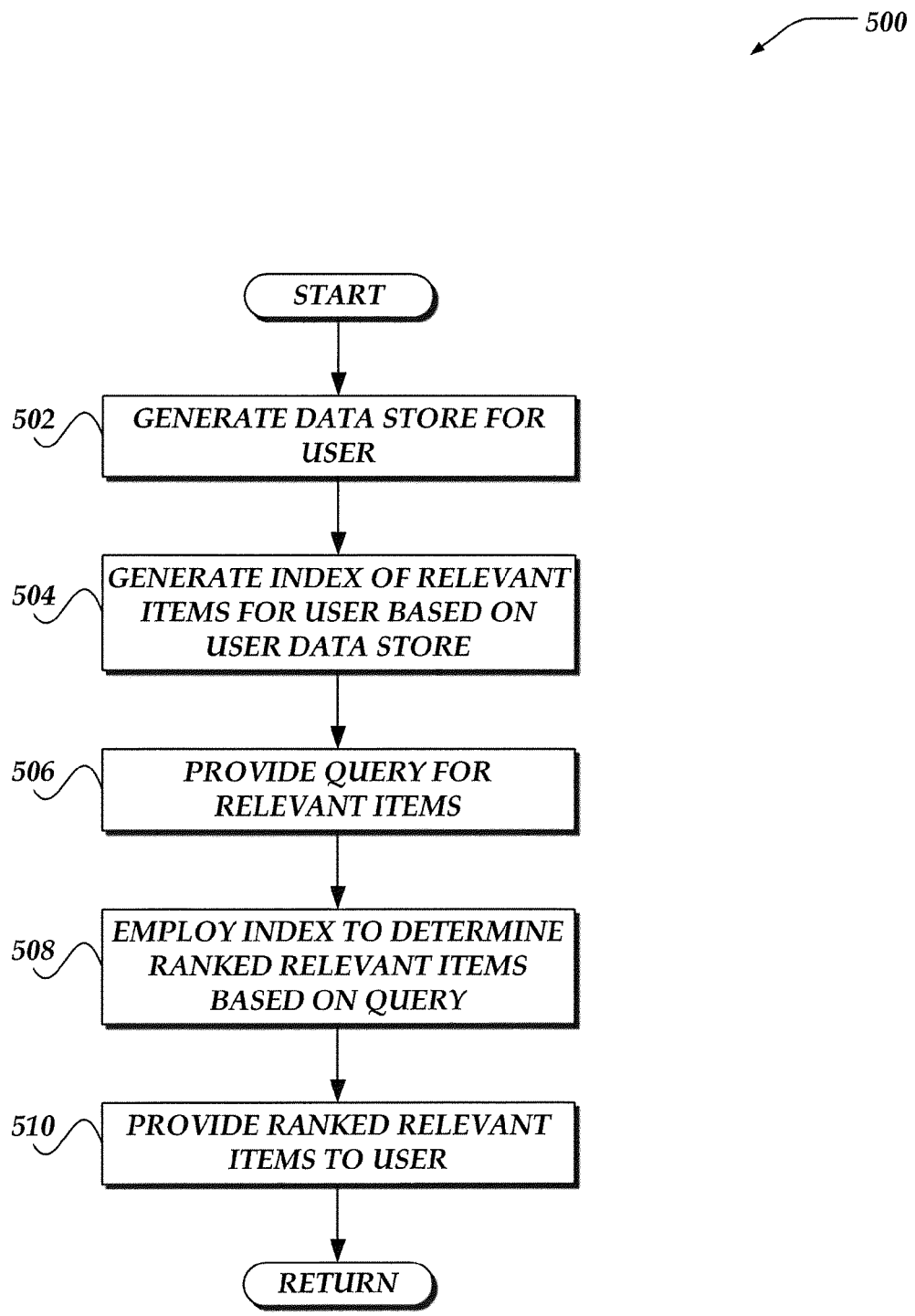
FIG. 5 illustrates a logical flow diagram generally showing one embodiment of an overview process for generating and employing an index of relevant items to determine and provide ranked relevant items to a user.

FIG. 5 illustrates a logical flow diagram generally showing one embodiment of an overview process for generating and employing an index of relevant items to determine and provide ranked relevant items to a user. Process 500 may begin, after a start block, at block 502, which is described in more detail below in conjunction with FIG. 6. Briefly, however, at block 502, a data store may be generated for a user that includes a plurality of items associated with the user. In various embodiments, the user data store may be generated based on items and/or user behaviors crawled from client devices and/or third-party services associated with the user. In some embodiments, a user data store may be generated for each of a plurality of users.

Process 500 may proceed to block 504, which is described in more detail below in conjunction with FIG. 7. Briefly, however, at block 504, an index of may be generated for the user based on the user data store. In various embodiments, the index for the plurality of items (in the data store) may be generated based on a relevancy between each of the plurality of items. In some embodiments, this index may be referred to as an index of relevant items. In at least one of the various embodiments, the index of relevant items may include a list (or other suitable data structure) that individually identifies each item in the item store and other items in the user data store that are relevant to the listed item.

Process 500 may continue at block 506, where a query for relevant items may be provided. In at least one of various embodiments, the query may correspond to one or more items in the index of relevant items. In some embodiments, the query may include one or more item identifiers for one or more corresponding indexed items.

In some embodiments, the query may be provided by and/or initiated by a user of a client device. For example, in at least one of various embodiments, a graphical user interface (e.g., relevant inference client 414 of FIG. 4) may enable a user to select an item, such as by clicking on and/or opening an email, contact, calendar entry, document, or the like. Once selected, an item identifier corresponding to the selected item may be provided to a relevant inference engine (e.g., RIE 404 of FIG. 4) as the query. The identifier of an item may uniquely identify the item from other items.

In some other embodiments, an action by the user may initiate the query. For example, a user may edit an email to include a contact in the user's address book. In this example, the contact may be utilized as the query, and an item identifier corresponding to the contact may be provided to the relevant inference engine (e.g., the name of the person may be the item identifier). In yet other embodiments, the query may include a combination of user selected items and inferred items based on user actions. For example, a user may forward an email to a contact in the user's address book. In this example, both the email and the contact may be provided as items associated with the query.

However, embodiments are not limited to the examples described above, and other mechanisms may be employed to provide a query for relevant items. For example, in various other embodiments, metadata of an item selected by a user and/or an action performed by a user may be utilized as the query. In at least one such embodiment, the metadata of the selected item may be utilized to classify the item and determine a corresponding item in the index of items with a same classification.

In any event, process 500 may proceed next to block 508, which is described in more detail below in conjunction with FIG. 8. Briefly, however, at block 508 the index of relevant items for the user may be employed to determine one or more ranked relevant items based on the query. In various embodiments, ranked relevant items may include items that that are relevant to at least one indexed item and that are rank ordered.

In various embodiments, for at least one indexed item, a ranking of other indexed items that are relevant to a corresponding indexed item may be determined. In some embodiments, the ranking of the relevant indexed items may be determined independent of the query (which may be referred to as pre-query ranking). In at least one such embodiment, this ranking may be performed in conjunction with generating and/or updating the index (e.g., at block 706 of FIG. 7). In other embodiments, the relevant indexed items determined in response to the query may be ranked (which may be referred to as post-query ranking) (e.g., at block 806 of FIG. 8). In some embodiments, the post-query ranking may be performed in-addition-to or independent-of the pre-query ranking.

Process 500 may continue next at block 510, where the ranked relevant items (i.e., the ranked indexed items) may be provided to a client device for display to the user. In some embodiments, a subset of the ranked relevant items may be displayed to the user. For example, in some embodiments, a three highest ranked relevant items may be displayed to the user (although other numbers of ranked relevant items may be display to the user). In other embodiments, the user may be enabled to request another subset of ranked relevant items, which may display different ranked relevant items (e.g., the three next highest ranked relevant items).

In some embodiments, the entire relevant item may be provided to the user, such as, for example, a complete contact entry. In other embodiments, an identifier, pointer, link, or other reference to the item may be provided. In some embodiments, the link may be to the item on the client device and/or the user data store for the user (e.g., user data store 408 of FIG. 4). In other embodiments, the link may be to a third-party service (e.g., a social media page).

In at least one of various embodiments, determining whether to provide an entire item or a link to the item may be based on the characteristics of the client device (e.g., the client device associated with the query for the relevant items) and/or characteristics of the item. In some embodiments, such a determination may be made based on computing capabilities of the client device, a format of the item, a file size of the item, or the like. For example, if the client device is a mobile phone and an item to be displayed to the user is a presentation, then a link to the presentation may be provided to the user.

In at least one of various embodiments, various thresholds may be employed to determine if the entire item is displayed to the user. For example, in some embodiments, an item size threshold may be determined based on the computing capabilities of the client device. If the item size is below the threshold, then the entire item may be display to the user; otherwise, a link to the item may be displayed. However, embodiments are not so limited and other mechanisms may be employed to provide one or more ranked relevant items to a client device for display to a user.

After block 510, process 500 may return to a calling process to perform other actions.

Figure 6:
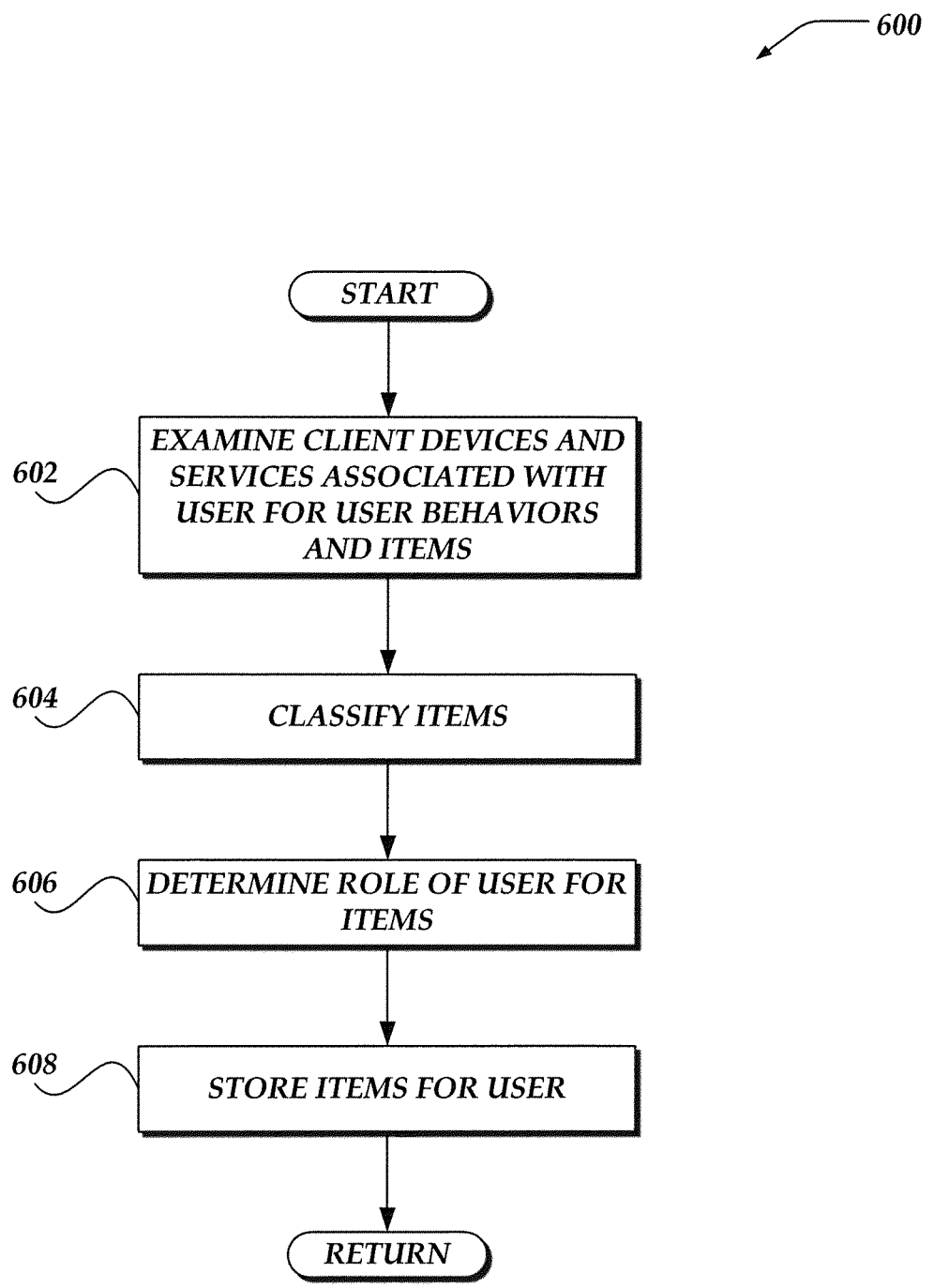
FIG. 6 illustrates a logical flow diagram generally showing one embodiment of a process for generating a data store for a user.

FIG. 6 illustrates a logical flow diagram generally showing one embodiment of a process for generating a data store for a user. In some embodiments, process 600 may be performed for each separate user to generate a separate user data store for each of a plurality of users.

Process 600 may begin, after a start block, at block 602, where client devices and/or third-party services associated with a user may be examined for items and/or user behaviors. In at least one embodiment, each client device associated with the user may be crawled for items and/or user behaviors. In some embodiments, these client devices may be identified based on the user being positively identified as using the client device. In at least one such embodiment, the client devices may include those client devices from which the user positively logged in to a relevant inference client (e.g., logging into relevant inference client 414 of personal information manager client 418 of FIG. 4).

In some embodiments, duplicate items may be ignored, discarded, or like for to use in the user data store. In at least one of various embodiments, metadata associated with items may be utilized to reduce a number of duplicate items stored in the user data store. For example, a document may be generated on a client device, and a backup copy may be stored to a third-party service. In various embodiments, the backup copy may be identified based on a comparison of the metadata—such as, file name, size, one or more timestamps, or the like—of the original document and the backup copy. If the backup copy is positively determined to be a duplicate, then the backup copy may be ignored and not stored in the user data store.

Along with items, the system may also crawl the client devices and third-party services for user behaviors. In some embodiments, the user behaviors may be included as part of the metadata of items. In other embodiments, the user behaviors may be stored separate from the items. In at least one of various embodiments, user behaviors may be crawled and/or determined based on user/system logs. For example, a user's email log may indicate an order for which the user views emails from different people, what emails are moved to what folder, a time when the user checks his/her calendar, or the like. It should be recognized that various system tools, personal identification manager logs, or the like, may be utilized to obtain the user behaviors and/or the items associated with the behaviors.

In any event, Process 600 may proceed to block 604, where the crawled items may be classified. In some embodiments, the crawled items may be classified based on a type of each item, such as, but not limited to, emails, contacts, calendar entries, other documents, or the like. In other embodiments, the crawled items may be classified based on metadata associated with the items, such as, but not limited to, size, author, creation time, other timestamps, or the like. In yet other embodiments, items may be classified based on user behaviors that are associated with the items. For example, emails moved to a particular folder may be classified together. However, embodiments are not so limited and other mechanisms for classifying items may be employed.

Process 600 may continue at block 606, where a role may be determined for the user for one or more items. In at least one of various embodiments, the role of the user for an item may be based on the user behaviors associated with the item. In some embodiments, multiple roles may be determined for an item.

In various embodiments, machine learning algorithms may be employed across items and/or user behaviors for the user and/or a plurality of different users to create/identify metrics for determining the roles of an item. In some other embodiments, the role associated with an item may be determined based on the classification of the item. For example, calendar entries may include at least one of the following roles: organizer, mediator, presenter, attendee, or the like. In comparison, an email may include at least one of the following roles: drafter, copied, replied, editor or review (e.g., if a document is attached to the email), or the like. However, these roles are examples and embodiments are not so limited, and other roles may be employed.

Process 600 may proceed next to block 608, where the crawled items may be stored for the user. In some embodiments, each item may be stored with additional metadata. This additional metadata may include the classification of the item, a role of the user for the item (if applicable), various timestamps, or the like. In various embodiments, a copy of the entire item may be stored in the user data store. In at least one of various embodiments, the user data store may be maintain in cloud computing resources.

After block 608, process 600 may return to a calling process to perform other actions.

Figure 7:
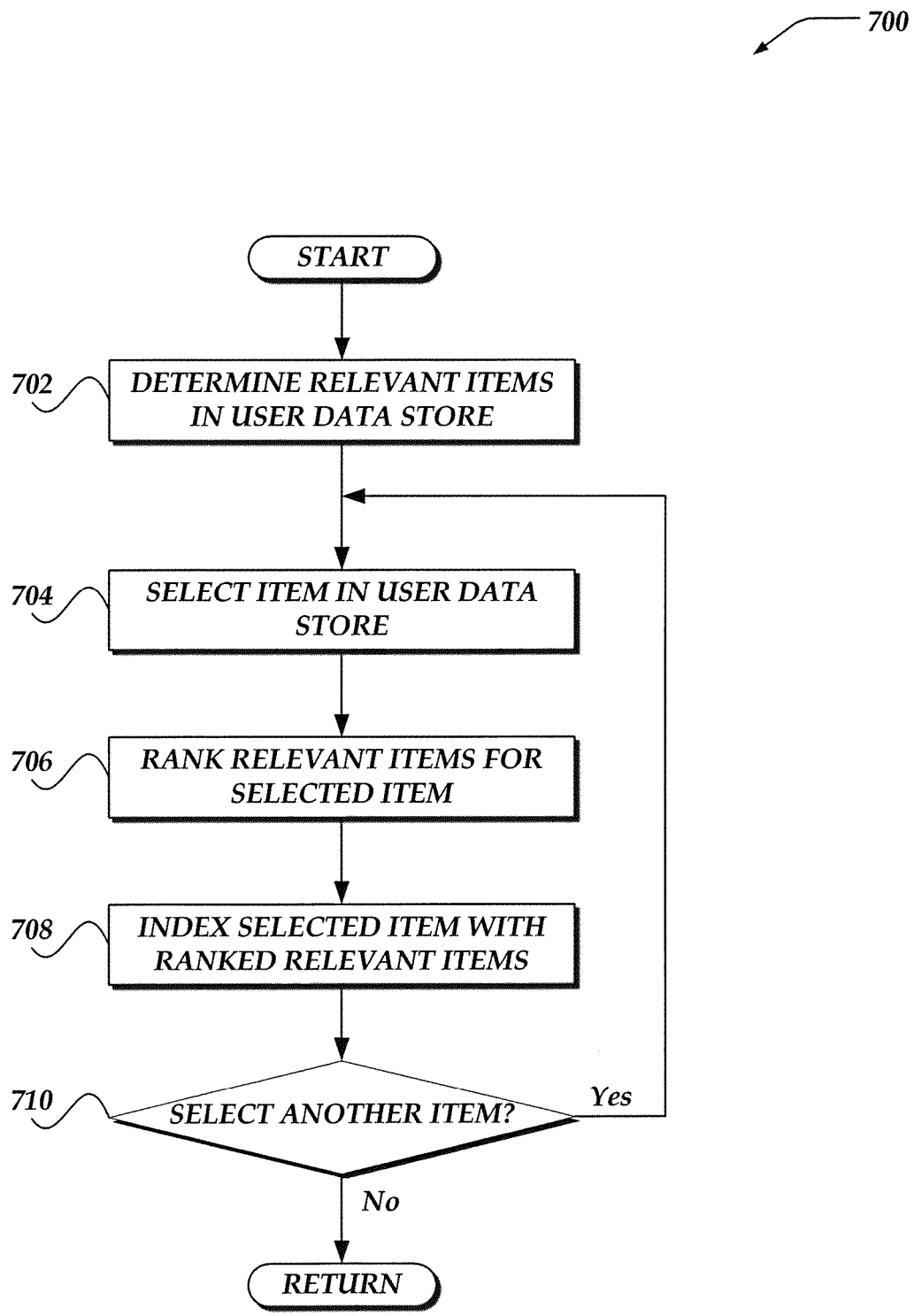
FIG. 7 illustrates a logical flow diagram generally showing one embodiment of a process for generating an index of ranked relevant items for a user.

FIG. 7 illustrates a logical flow diagram generally showing one embodiment of a process for generating an index of ranked relevant items for a user. In some embodiments, process 700 may be performed for each separate user to generate a separate index of ranked relevant items for each user. In other embodiments, process 700 may be employed to generate a generic index of ranked relevant items for a plurality of users. In at least one such embodiment, a generic user data store (e.g., a global data store shared by a plurality of users) may be utilized to determine and rank relevant items.

In some other embodiments, a generic index of ranked relevant items for a plurality of users may be generated based on a combination of a plurality of separate indexes for each of the plurality of users. In at least one such embodiment, the separate indexes (which may be referred to as individual indexes) may be compared to generate the generic index (which may be referred to as a global index). For example, two or more items may be determined to be relevant for the global index if a number of separate individual indexes above a threshold value include the same two or more items as being relevant. In at least one of various embodiments, this number of separate individual indexes may be employed to rank the relevant items (e.g., the more individual indexes that share relevant items, the higher the rank in the global index for the same relevant items). However, embodiments are not so limited and other mechanisms and/or algorithms may be employed to determine rankings of relevant items for a global index. For example, in other embodiments, the rankings of relevant items in the individual indexes may be employed to determine a ranking of the relevant items in the global index, such as, for example, by determining a weighted average of rankings for same relevant items in the individual indexes.

In any event, process 700 may begin, after a start block, at block 702, where relevant items in the item store may be determined. In various embodiments, a relevancy between each of the plurality of items may be determined. The relevancy between items may be determined by employing various machine learning algorithms, key word/phrase matching, document clustering algorithms, or the like, or combinations thereof. In at least one of various embodiments, these algorithms may be employed to detect patterns in items stored in the user's data store, which may be employed to determine if one or more items is relevant to another item. For example, items may be relevant if they both include a number of same words and/or phrases that is above a threshold value. However, embodiments are not so limited. In other embodiments, a document clustering algorithm may be employed to create clusters of items, where each item in a cluster may be relevant to other items in the same cluster. The index of relevant items may then be generated (e.g., at block 708) based on these clusters, such as, for example, by listing each item in the user data store as a separate entry in the index with identifiers to other items in a same cluster.

As described herein, metadata associated with items in the user data store may be stored and/or maintained. This metadata may include, but is not limited to, an item identifier; timestamps for when the item was created, stored, modified, viewed, or the like; user behaviors associated with the item; a role of the user; or the like. In some embodiments, items may be relevant based on a comparison of their metadata. In at least one of various embodiments, items may be relevant if they both have a timestamp value within a time range threshold. For example, if one item is created within one minute (or some other time range) of reading another item, then those items may be determined to be relevant.

In other embodiments, user behaviors associated with items may be employed to determine relevancy of items. Examples of user behaviors may include, but is not limited to, moving an email from one folder to another folder, opening an email, an order of opening new emails, responding to emails, creating a calendar entry after viewing an email, sending an email while another document is open and/or being edited, or the like. In at least one of various embodiments, items may be relevant if a user performs similar or same actions (or behaviors) to both items (e.g., the user moves different emails to a same folder).

In some other embodiments, an administrator may be enabled to determine one or more thresholds for determining when items are relevant to each other. For example, using key word/phrase matching algorithms may utilize a percentage threshold, such that items may be relevant if both items contain a percentage of same words, keys, or phrases that is above a predetermined threshold.

However, embodiments are not so limited and other mechanisms and/or algorithms, or combinations thereof, may be employed to determined relevant items.

Process 700 may proceed to block 704, where an item in the user store may be selected. In some embodiments, an initial item may be randomly selected. In other embodiments, items may be selected based on an item identifier, time tamp, or other metadata, and may be selected in virtually any order, such as, but not limited to, alphabetically, numerically, chronologically, or the like. Selecting items may be utilized for entry and/or generation of the index of relevant items.

Process 700 may continue at block 706, where the relevant items may be ranked for the selected item. In at least one of various embodiments, embodiments of block 706 may be performed independent of a query (e.g., the relevant items may be ranked pre-query). In various embodiments, the relevant items (i.e., other items) may be ranked based on at least a degree of relevancy that the relevant items have to the selected item. In some embodiments, the degree of relevancy may be based on the mechanisms and/or algorithms utilized to determine relevant items. In at least one of various embodiments, each relevant item may be given a score based on how relevant it is to the selected item. A relevant item with a higher score than another relevant item may be ranked higher than the other relevant item. In some embodiments, the score of a relevant item may be based on a percentage of shared/same key words/phrases in both the relevant item and the selected item compared to a total number of words/phrases in the selected item (or a combined total number of words/phrases in the relevant item and the selected item). By utilizing percentages to generate scores, a relevant item with a higher percentage may be ranked higher than an item with a lower percentage.

In some other embodiments, the rankings may be based on the metadata associated with the relevant items and/or the selected item. In at least one of various embodiments, the rankings may be based on a time decay function of the relevant items. The time decay function for an item may be based on a comparison of a timestamp associated with the item and a current time of when relevant items are being ranked. In some embodiments, this timestamp may be a time when an item was opened, read, modified, created, deleted, moved, or the like. In other embodiments, the timestamp may include a time derived from the content of the item. For example, a timestamp for a calendar entry may be a time/date when a corresponding meeting is scheduled to occur. In this example, the time decay function may be based on a comparison of the current time and the meeting time, such that a ranking (or score utilized to determine the ranking) of the calendar entry (i.e., ranked item) may increase the closer the current time gets to the meeting time. Similarly, after the meeting time passes, the ranking (or score utilized to determine the ranking) of the calendar entry may decrease as time passes. It should be recognized that such time decay may not be limited to calendar entries by may be employed for other items. For example, the older an email may be ranked lower than another email (e.g., based on a comparison of the current time and a time an email was created or received).

In yet other embodiments, the rankings may be determined based on the role of the corresponding user for relevant items and/or the selected item. For example, if the user is an organizer for a meeting (i.e., the selected entry), then relevant contacts (i.e., relevant items) may be ranked higher than relevant documents (i.e., other relevant items). In contrast, if the user is a reviewer for the meeting, then relevant documents may be ranked higher than relevant contacts.

However, embodiments are not so limited; and other mechanisms and/or algorithms, or combinations thereof, may be employed to determine a ranking of the relevant items for the selected item. In some other embodiments, block 706 may be optional, such that the relevant items are not pre-ranked prior to receiving or independent of a query.

In any event, process 700 may proceed next to block 708, where the selected item may be indexed with the ranked relevant items. In some embodiments, an index of ranked relevant items may be modified to include an entry in the index for the selected item. In at least one of various embodiments, the selected item may be referenced in the index by its item identifier. Along with the item identifier, the index may include an item identifier and ranking of each of the relevant items. In some embodiments, the ranking may be maintained in the index based on an order in which the relevant item identifiers are listed (e.g., a first listed relevant item identifier may be a highest ranked relevant item, a second listed relevant item identifier may be a second highest ranked relevant item, and so on). In other embodiments, a ranking value may be maintained in the index for the relevant items.

Process 700 may continue next at decision block 710, where another item may be selected. In some embodiments, another item may be selected until all items in the user data store are selected and indexed. In various embodiments, items may be selected alphabetically, numerically, chronologically, or the like. If another item may be selected, then process 700 may loop to block 704 to select another item; otherwise, process 700 may return to a calling process to perform other actions.

Figure 8:
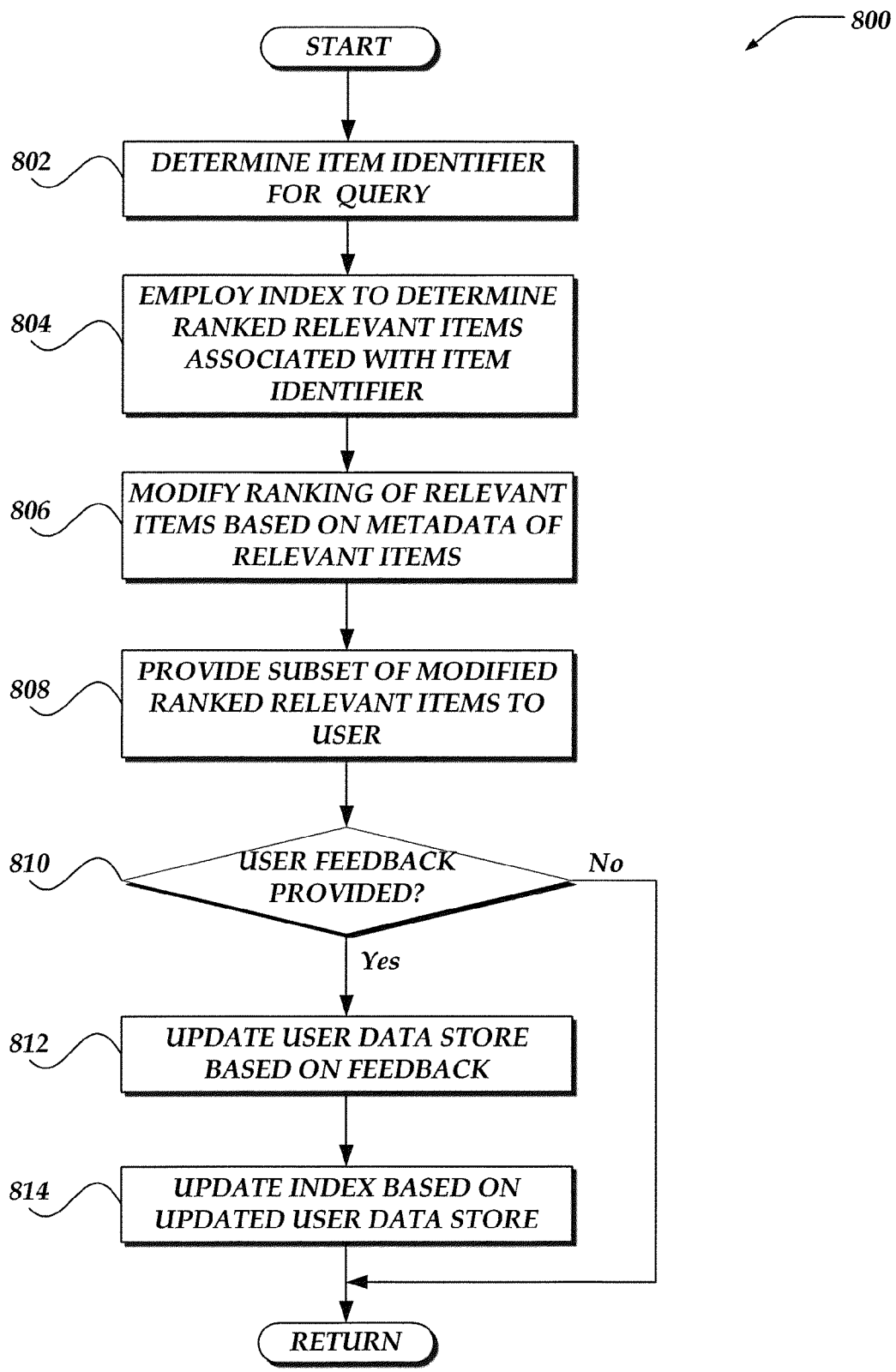
FIG. 8 illustrates a logical flow diagram generally showing one embodiment of a process for determining and providing ranked relevant items to a user based on a query.

FIG. 8 illustrates a logical flow diagram generally showing one embodiment of a process for determining and providing ranked relevant items to a user based on a query. Process 800 may begin, after a start block, at block 802, where an item identifier may be determined for a query. In various embodiments, one or more item identifiers may be determined for one or more items associated with the query. In at least one of various embodiments, the items associated with the query may be selected by the user and/or determined based on actions performed by the user (e.g., as described at block 506 of FIG. 5). For example, an item identifier may be determined for the query based on an item selected by the user.

The item identifier may be an identifier that uniquely identifier an item in the index. In at least one of various embodiments, metadata associated with an item may include the item's identifier. In other embodiments, the item identifier may be determined based on a name of the item (e.g., a document name), an arbitrarily-generated identifier, or the like. In various embodiments, the item identifier may be generated when an item is received and/or created (e.g., when the user data store is generated at block 502 of FIG. 5).

Process 800 may proceed to block 804, where an index of relevant items may be employed to determine ranked relevant items that are associated with the item identifier. In various embodiments, the index of relevant items may be the individual index generated by process 700 of FIG. 7 for the user. In other embodiments, a generic index may be employed to determine ranked relevant items.

In some embodiments, employing the index of relevant items may include searching the index for the one or more item identifiers associated with the query. If an item identifier is located in the index, each item relevant to the located item identifier (e.g., the indexed item) may be determined as the relevant items to the query. In some embodiments, these relevant items may be arbitrarily ordered or they may be pre-ranked (e.g., as described at block 706 of FIG. 7). In some embodiments, where multiple item identifiers are associated with the query, multiple sets of relevant items may be determined (e.g., one set per item identifier).

Process 800 may continue at block 806, where the ranking of the relevant items to the query may be modified and/or determined. In at least one of various embodiments, where relevant items in the index are pre-ranked, the rankings may be modified at least based on metadata associated with the relevant items. In some embodiments, block 806 may employ embodiments of block 706 of FIG. 7 to re-rank the relevant items. In yet other embodiments, where the relevant items in the index are not pre-ranked, then the block 806 may employ embodiments of block 706 to determine a ranked order of the relevant items associated with the query. In various embodiments, a current time of the query and the time delay function of the relevant items may be utilized to rank and/or modify the rankings of the relevant items.

As described above, the query may be associated with a plurality of item identifiers. By employing embodiments of block 804, multiple sets of ranked relevant items may be determined (e.g., one set per item identifier). In various embodiments, these ranked relevant items may be aggregated into a combined set of indexed items that are relevant to the query. In at least one such embodiment, the indexed items of the combined set may be rank ordered. This ranking may be based on pre-query rankings, a score of relevant items (e.g., as utilized to pre-rank the relevant items), a comparison of a current time of the query and a time delay function of the relevant items, same or similar items in the multiple sets of relevant items, or the like, or any combination thereof.

The above examples of ranking and/or re-ranking relevant items are not to be construed as limiting and other mechanisms and/or algorithms may be employed to rank and/or re-rank items that are relevant to one or more indexed items associated with a query.

In some other embodiments, block 806 may be optional and the rankings of the relevant items may not be modified in conjunction with the query. In at least one such embodiment, the pre-query rankings may be employed to determine a subset of ranked relevant items to display to the user (e.g., at block 808).

In any event, process 800 may proceed next to block 808, where a subset of the ranked relevant items (or modified ranked relevant items) may be provided to the user. In some embodiments, a user and/or administrator may select a maximum number of ranked relevant items to be provided to the user. For example, the three highest ranking relevant items may be provided to the user. In various embodiments, providing relevant items to the user may include displaying the items to the user. In other embodiments, links and/or references to some of the provided relevant items may be provided based on characteristics of the provided items and/or limitations of a client device receiving the relevant items for display to the user.

Process 800 may continue next at decision block 810, where a determination may be made whether user feedback is provided. In some embodiments, are user may affirmatively provide feedback indicating a success of the ranked relevant items. For example, a user may be provided a survey asking the user if the items that were provided were actually relevant and/or to what degree they are relevant (e.g., on a scale of zero to five). In other embodiments, user feedback may be inferred from user behaviors associated with the provided ranked relevant items. For example, if the user selects to view and/or edit a provided relevant item, then it may be inferred that the item was relevant. If the user provided feedback, then process 800 may flow to block 812; otherwise, process 800 may return to a calling process to perform other actions.

At block 812, a data store for the user may be updated based on the user feedback. In some embodiments, the user feedback may be stored with a corresponding item in the user data store (e.g., as item metadata). In various embodiments, the user feedback may be a user behavior and maintained in the user data store as such.

Process 800 may proceed to block 814, where the index of items for the user may be updated based on the updated item store. In at least one of the various embodiments, block 814 may employ embodiments of block 504 of FIG. 5 to update the index of items based on the updated user data store.

After block 814, process 800 may return to a calling process to perform other actions.

Figure 9:
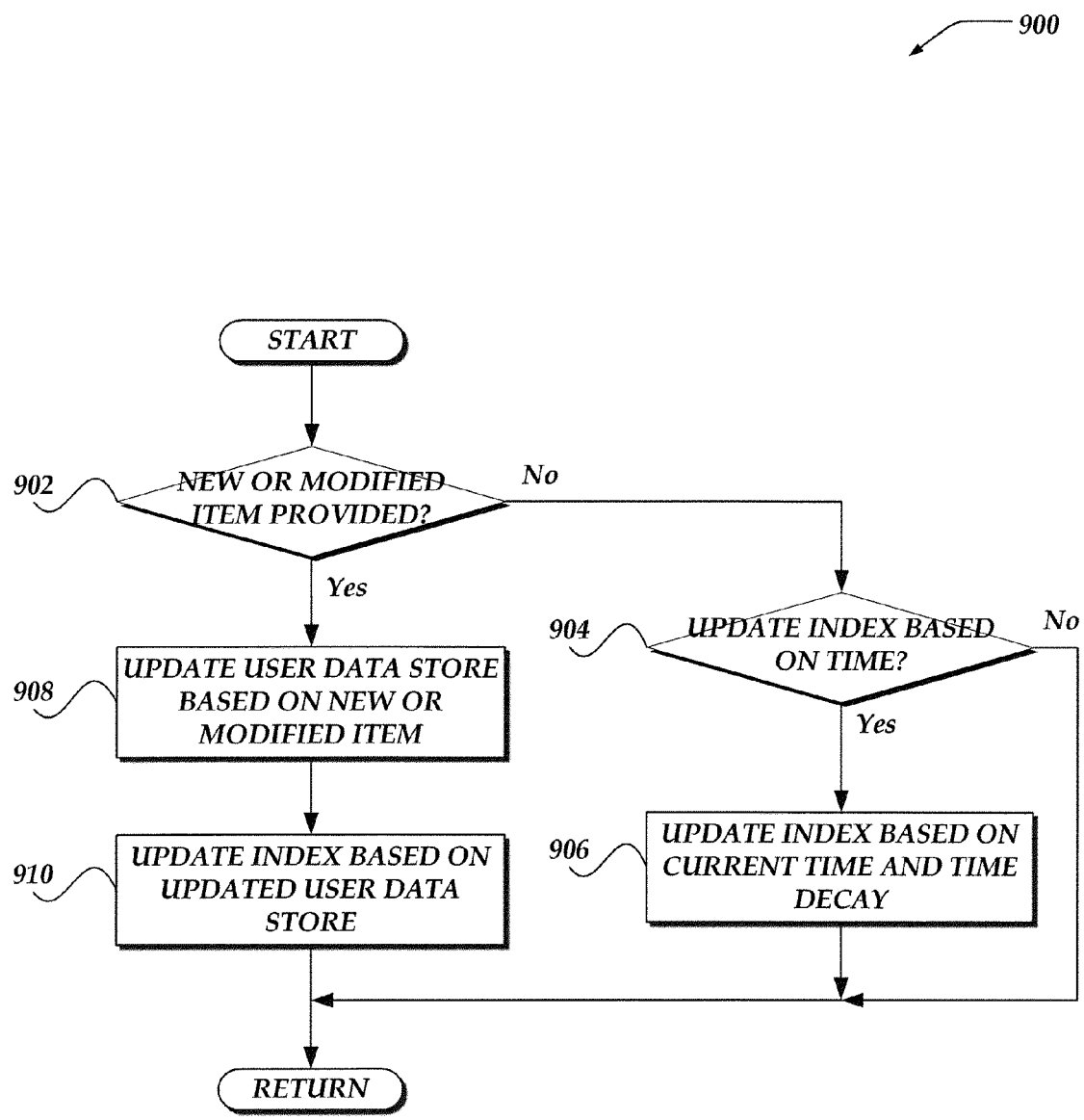
FIG. 9 illustrates a logical flow diagram generally showing one embodiment of a process for updating a data store and/or an index of items for a user.

FIG. 9 illustrates a logical flow diagram generally showing one embodiment of a process for updating a data store and/or an index of items for a user. Process 900 may begin, after a start block, at decision block 902, where a determination may be made whether a new or modified item is provided. In some embodiments, the system may periodically crawl the client devices and/or the third-party services for new or modified items (such as is described at block 602 of FIG. 6). In other embodiments, if an item is created and/or modified, a relevant inference client may provide the new/modified item to a relevant inference engine for processing. If a new or modified item is crawled and/or provided, then process 900 may flow to block 908; otherwise, process 900 may flow to decision block 904.

At decision block 904, a determination may be made whether to update the index of items based on time. In at least one of various embodiments, the index of items may be updated at predetermined time intervals, randomly, at a time associated with an item (e.g., after a meeting has occurred), or the like. If the index may be updated based on time, then process 900 may flow to block 906; otherwise, process 900 may return to a calling process to perform other actions.

At block 906, the index of items may be updated based on at least a current time and a time decay function of indexed items (or the items that are relevant to a particular indexed item). In at least one of various embodiments, block 906 may employ embodiments of process 700 of FIG. 7 to update the index of relevant items based on the time decay function of items. For example, if the index is updated every hour, then the rank of items associated with an upcoming event may increase and a rank of items associated with a past event may decrease. However, embodiments are not so limited and other mechanisms and/or algorithms may be employed to update the index of relevant items. After block 906, process 900 may return to a calling process to perform other actions.

If at decision block 902, a new or modified item is provided, then process 900 may flow from decision block 902 to block 908. At block 908, a data store of the user may be updated based on the new or modified item. In at least one of various embodiments, block 908 may employ embodiments of process 500 of FIG. 5 to update the user's data store. In various embodiments, the new item may be added to the data store (which may include classifying the new item and/or determining a role of the user for the new item). In other embodiments, a previously store item may be updated or replaced based on the modified item. In at least one of various embodiments, updating a previously stored item based on a modified item may include re-classifying and/or determining a new/modified role of the user for the item.

In any event, process 900 may proceed to block 910, where the index of items of the user may be updated based on the updated item store. In at least one of various embodiments, block 910 may employ embodiments of process 600 of FIG. 6 to update an index of relevant items. In some embodiments, a relevancy and/or rank of items in the index that are associated with the new/modified item may be updated.

After block 910, process 900 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Illustrations

Figure 10A:
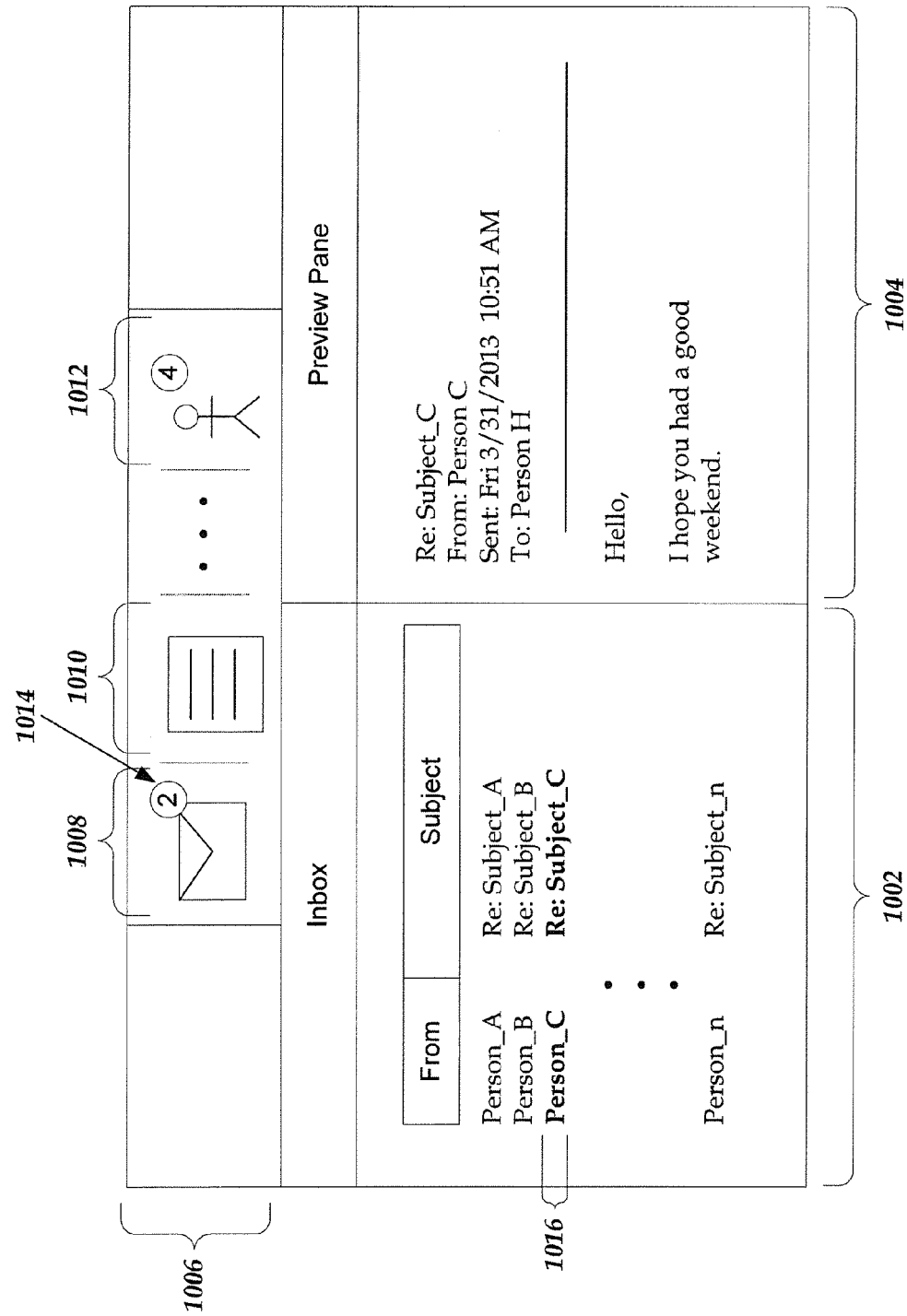
FIGS. 10A-10B show non-limiting, non-exhaustive use case examples of embodiments of a graphical user interface for providing a query for relevant items and displaying the results.
Figure 10B:
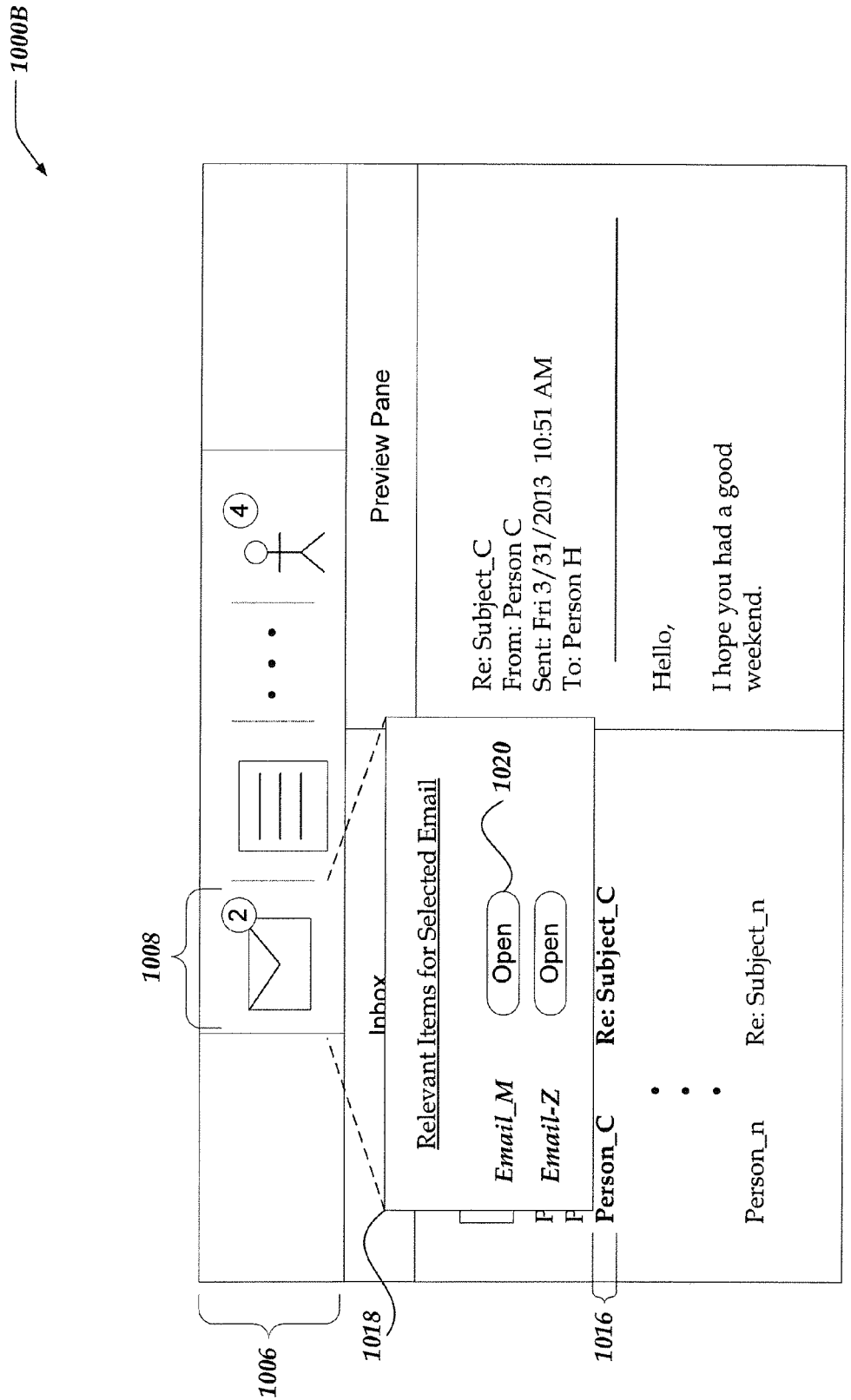

FIGS. 10A-10B show non-limiting, non-exhaustive use case examples of embodiments of a graphical user interface for providing a query for relevant items and viewing the results. Graphical user interface (GUI) 1000A may be an embodiment of relevant inference client 414 and/or relevant inference client 420 of FIG. 4. As illustrated, GUI 1000A may display a user's email inbox, which may include inbox pane 1002 and preview pane 1004. Inbox pane 1002 may display a list of emails that the user has received. Preview pane 1004 may display the contents of an email selected by the user, such as if the user clicks on email 1016 from inbox pane 1002. It should be understood that GUI 1000A may include other window panes, toolbars, drop-down menus, or the like, that are not illustrated in FIG. 10A.

GUI 1000A may also include a relevant items toolbar 1006. Toolbar 1006 may include one or more icons. In some embodiments, each icon of toolbar 1006 may correspond to a different classification of relevant items, such as, but not limited to, emails (e.g., icon 1008), documents (e.g., icon 1010), contacts (e.g., icon 1012), or the like. In at least one of various embodiments, one or more of these icons may include a gleam, such as gleam 1014. A gleam may indicate how many items of that classification are relevant to a selected item.

For example, a user may select email 1016. Preview pane 1004 may update to show the contents of email 1016. The selected email may be utilized as a query for relevant items. By employing embodiments described herein, an item identifier for email 1016 and an index of relevant items for the user may be utilized to determine one or more ranked relevant items for the selected email. The icons in toolbar 1006 may be updated to include a gleam that indicates how many items of that classification may be relevant to email 1016. As illustrated, there may be two relevant emails and four relevant contacts. In some embodiments, no gleam may be displayed if the results from the query fail to return relevant items of that classification, such as is shown by icon 1010. It should be recognized that the locations and images used for the icons and gleams is for illustration purposes and should not be construed as limiting or exhaustive.

After a user selects an item (e.g., email 1016) and the icon's gleams are updated to indicate a number of relevant items, the user may select an icon from toolbar 1006 to view the relevant items of that classification, as shown in FIG. 10B.

GUI 1000B may be an embodiment of GUI 1000A of FIG. 10A. As described above, a user may select email 1016 and icons in toolbar 1006 may be updated to include a gleam indicating a number of items that are relevant to the select email. A user may select an icon in toolbar 1006 to view the relevant items of the corresponding classification. For example, a user may click on icon 1008 to view the relevant emails. As illustrated, a window may open and display the relevant items. In some embodiments, a title or identifier of the relevant items may be displayed to the user. In at least one such embodiment, the user may be enabled to access the item by clicking on a button (e.g., button 1020) or other interface selection mechanism. In other embodiments, the contents of the relevant items may be displayed to the user (not shown).

Figure 11A:
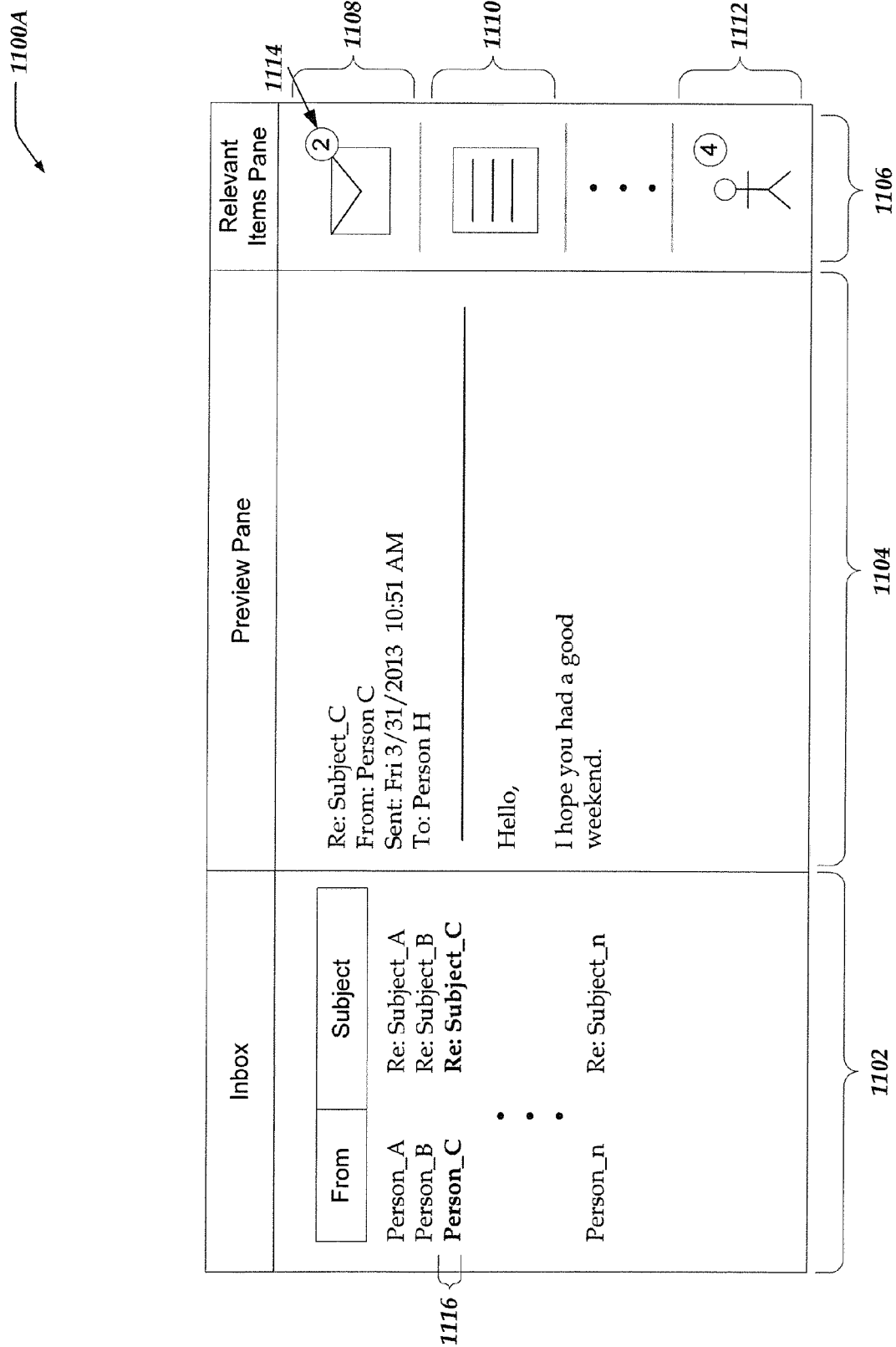
FIGS. 11A-11B show non-limiting, non-exhaustive use case examples of alternative embodiments of a graphical user interface for providing a query for relevant items and displaying the results.
Figure 11B:
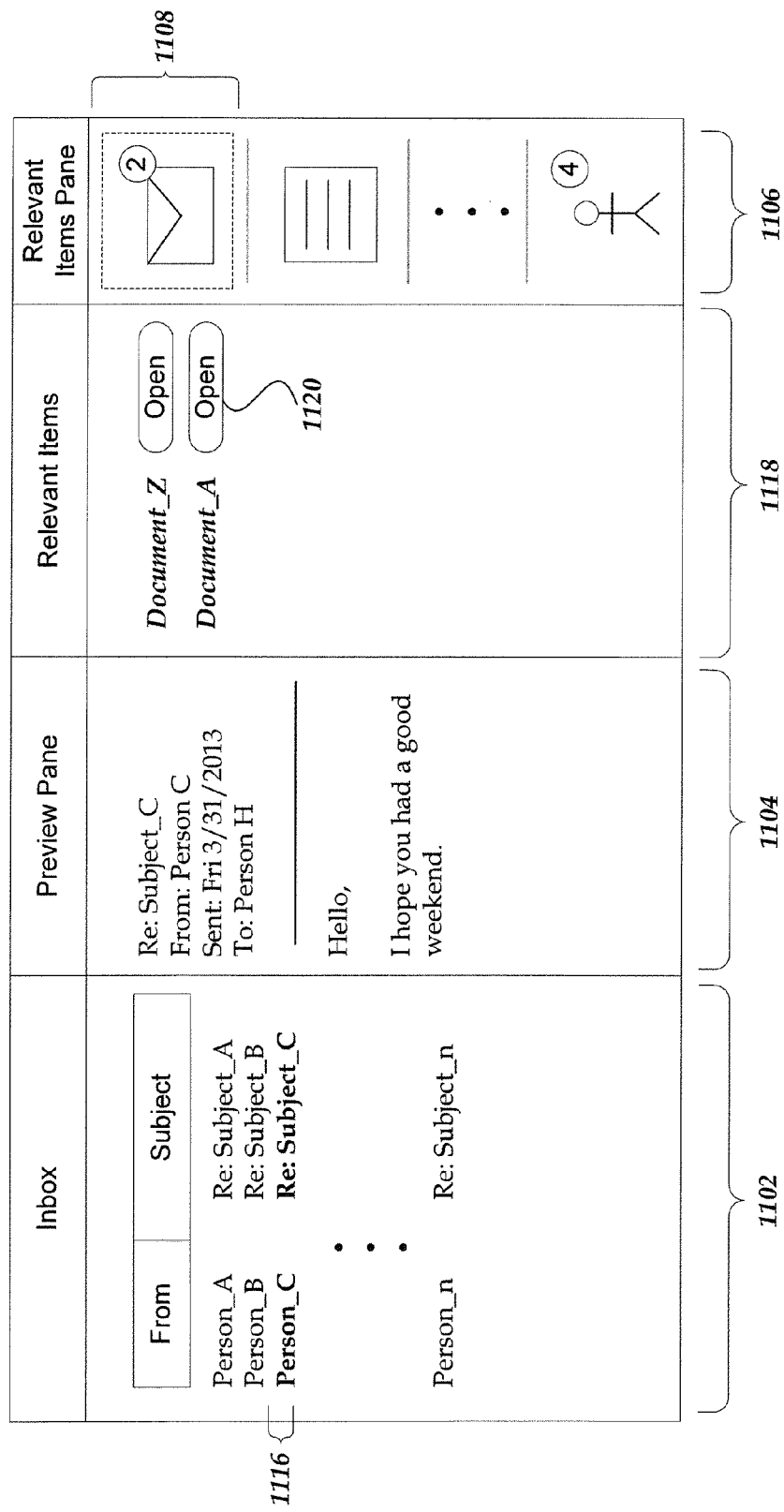

FIGS. 11A-11B show non-limiting, non-exhaustive use case examples of alternative embodiments of a graphical user interface for providing a query for relevant items and viewing the results.

Graphical user interface (GUI) 1100A may be an embodiment of relevant inference client 414 and/or relevant inference client 420 of FIG. 4. As illustrated, GUI 1100A may display a user's email inbox, which may include inbox pane 1102, preview pane 1104, and relevant items pane 1106. Inbox pane 1102 may display a list of emails that the user has received. Preview pane 1104 may display the contents of an email selected by the user, such as if the user clicks on email 1116 from inbox pane 1102. It should be understood that GUI 1100A may include other window panes, toolbars, drop-down menus, or the like, that are not illustrated in FIG. 11A.

Relevant items pane 1106 may include one or more icons. Similar to the icons in toolbar 1006 of FIG. 10A, the icons in relevant items pane 1106 may correspond to different classifications of relevant items, such as, but not limited to, emails (e.g., icon 1108), documents (e.g., icon 1110), contacts (e.g., icon 1112), or the like. In at least one of various embodiments, one or more of these icons may include a gleam, such as gleam 1114. Gleam 1114 may be an embodiment of gleam 1014 of FIG. 10A.

Similar to the description of FIG. 10A, a user may select email 1116. Preview pane 1104 may update to show the contents of email 1116. The selected email may be utilized as a query for relevant items. By employing embodiments described herein, an item identifier for email 1116 and an index of relevant items for the user may be utilized to determine one or more ranked relevant items for the selected email. The icons in relevant items pane 1106 may be updated to include a gleam that indicates how many items of that classification may be relevant to email 1116. As illustrated, there may be two relevant emails and four relevant contacts. In some embodiments, no gleam may be displayed if the results from the query fail to return relevant items of that classification, such as is shown by icon 1110. It should be recognized that the locations and images used for the icons and gleams is for illustration purposes and should not be construed as limiting or exhaustive.

After a user selects an item (e.g., email 1116) and the icon's gleams may be updated to indicate a number of relevant items, the user may select an icon from relevant items pane 1106 to view the relevant items of that classification, as shown in FIG. 11B.

GUI 1100B may be an embodiment of GUI 1100A of FIG. 11A. As described above, a user may select email 1116 and icons in relevant items pane 1106 may be updated to include a gleam indicating a number of items that are relevant to the select email. In some embodiments, a user may select an icon in relevant items pane 1106 to view the relevant items of the corresponding classification. For example, a user may click on icon 1108 to view the relevant emails. As illustrated, a new pane, pane 1118, may slide open within the same window as inbox pane 1102, preview pane 1104, and relevant items pane 1106. In some embodiments, a size and/or location of inbox pane 1102 and/or preview pane 1104 may be adjusted to accommodate pane 1118. In some embodiments, a title or identifier of the relevant items may be displayed to the user. In at least one such embodiment, the user may be enabled to access the item by clicking on a button (e.g., button 1120) or other interface selection mechanism. In other embodiments, the contents of the relevant items may be displayed to the user (not shown). In at least one of various embodiments, the relevant items displayed to the user may be ranked, such that a highest ranking relevant item may be listed first, or on top of the listed items, a second highest ranking relevant item may be listed second, and so on.

However, embodiments are not limited to the examples above and other visual graphics may be employed to view different panes, or different classifications of relevant items. For example, in some embodiments where the relevant inference client (e.g., GUI 1100A of FIG. 11A) is executing on a mobile device, a user may be enabled to swipe and/or click between different viewing windows for the inbox, relevant emails, relevant documents, relevant contacts, or the like.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing items over a network, wherein at least one network device enables actions to be performed, comprising:
    generating a data store for a user that includes at least a plurality of items associated with the user;
    determining at least one separate role of the user for each individual item in the plurality of items;
    determining a relevancy between each item of the plurality of items and each other item of the plurality of items;
    generating an index for the plurality of items based on at least the determined relevancies, wherein each indexed item includes an identifier to other indexed items that are relevant to a corresponding indexed item;
    for at least one indexed item, determining a ranking of the other indexed items that are relevant to the corresponding indexed item, wherein the at least one separate role of the user is employed to determine the ranking;
    in response to a selection of an indexed item, providing at least a subset of the ranked indexed items for the selected indexed item for display to the user, wherein the subset of ranked indexed items is determined based on the at least one role of the user for the selected indexed item; and
    displaying the selected index item in a preview pane to the user, wherein the preview pane includes one or more gleams that correspond to one of a plurality of categories for the plurality of items and also indicate a number of other ranked index items that are relevant to the selected indexed item.

2. The method of claim 1, further comprising:
    generating separate data stores and separate indexes of relevant indexed items for each of a plurality of users.

3. The method of claim 1, wherein the ranking of the other indexed items is based on at least a degree of relevancy that the other indexed items have to the corresponding indexed item.

4. The method of claim 1, wherein determining the ranking further comprises at least one of the following actions:
    for each indexed item, determining a ranked order of the other indexed items that are relevant to the corresponding indexed item independent of the selection of the indexed item; or
    employing the selection of the indexed item to determine the at least one indexed item, and determining another ranked order of the other indexed items that are relevant to the determined at least one indexed item.

5. The method of claim 1, wherein the ranking of the other indexed item, further comprises employing a comparison of a current time of the selection of the indexed item and a time decay function associated with the other indexed items.

6. The method of claim 1, wherein generating the data store for the user, further comprises:
    examining at least one of a client device or a third-party service for the plurality of items, wherein the user is associated with the at least one client device and the at least one third-party service.

7. The method of claim 1, wherein the relevancy between each of the plurality of items is based on at least one user behavior associated with the plurality of items.

8. The method of claim 1, further comprising:
    updating the data store based on at least one of a new item or a modified item; and
    updating the index based on at least the updated data store.

9. The method of claim 1, further comprising:
    enabling the user to provide feedback regarding at least one of the subset of the ranked indexed items; and
    employing the feedback to update the data store and the index.

10. A system for managing items over a network, comprising:
    a client device that is configured to perform actions, including:
        receiving a selection of an indexed item that is associated with a user; and
        displaying a subset of ranked indexed items to the user;
    a server device that is configured to perform actions, including:
        generating a data store for the user that includes at least a plurality of items associated with the user;
        determining at least one separate role of the user for each individual item in the plurality of items;
        determining a relevancy between each item of the plurality of items and each other item of the plurality of items;
        generating an index for the plurality of items based on at least the determined relevancies, wherein each indexed item includes an identifier to other indexed items that are relevant to a corresponding indexed item;
        for at least one indexed item, determining a ranking of the other indexed items that are relevant to the corresponding indexed item, wherein the at least one separate role of the user is employed to determine the ranking;
        in response to a selection of an indexed item, providing at least a subset of the ranked indexed items for the selected indexed item for display to the user, wherein the subset of ranked indexed items is determined based on the at least one role of the user for the selected indexed item; and
        displaying the selected index item in a preview pane to the user, wherein the preview pane includes one or more gleams that correspond to one of a plurality of categories for the plurality of items and also indicate a number of other ranked index items that are relevant to the selected indexed item.

11. The system of claim 10, further comprising:
    generating separate data stores and separate indexes of relevant indexed items for each of a plurality of users.

12. The system of claim 10, wherein the ranking of the other indexed items is based on at least a degree of relevancy that the other indexed items have to the corresponding indexed item.

13. The system of claim 10, wherein determining the ranking further comprises at least one of the following actions:
    for each indexed item, determining a ranked order of the other indexed items that are relevant to the corresponding indexed item independent of the selection of the indexed item; or
    employing the selection of the indexed item to determine the at least one indexed item, and determining another ranked order of the other indexed items that are relevant to the determined at least one indexed item.

14. The system of claim 10, wherein the ranking of the other indexed item, further comprises employing a comparison of a current time of the selection of the indexed item and a time decay function associated with the other indexed items.

15. The system of claim 10, wherein generating the data store for the user, further comprises:

examining at least one of a client device or a third-party service for the plurality of items, wherein the user is associated with the at least one client device and the at least one third-party service.

16. The system of claim 10, wherein the relevancy between each of the plurality of items is based on at least one user behavior associated with the plurality of items.

17. A network device for managing items over a network, comprising:
   a memory for storing instructions and a data store for a user; and
   a processor that executes the instructions to enable actions, including:
      generating the data store for a user that includes at least a plurality of items associated with the user;
      determining at least one separate role of the user for each individual item in the plurality of items;
      determining a relevancy between each item of the plurality of items and each other item of the plurality of items;
      generating an index for the plurality of items based on at least the determined relevancies, wherein each indexed item includes an identifier to other indexed items that are relevant to a corresponding indexed item;
      for at least one indexed item, determining a ranking of the other indexed items that are relevant to the corresponding indexed item, wherein the at least one separate role of the user is employed to determine the ranking;
      in response to a selection of an indexed item, providing at least a subset of the ranked indexed items for the selected indexed item for display to the user, wherein the subset of ranked indexed items is determined based on the at least one role of the user for the selected indexed item; and
      displaying the selected index item in a preview pane to the user, wherein the review s ane includes one or more leams that corres s and to one of a s luralit of cate ories for the plurality of items and also indicate a number of other ranked index items that are relevant to the selected indexed item.

18. The network device of claim 17, further comprising:
   generating separate data stores and separate indexes of relevant indexed items for each of a plurality of users.

19. The network device of claim 17, wherein the ranking of the other indexed items is based on at least a degree of relevancy that the other indexed items have to the corresponding indexed item.

20. The network device of claim 17, wherein determining the ranking further comprises at least one of the following actions:
   for each indexed item, determining a ranked order of the other indexed items that are relevant to the corresponding indexed item independent of the selection of the indexed item; or
   employing the selection of the indexed item to determine the at least one indexed item, and determining another ranked order of the other indexed items that are relevant to the determined at least one indexed item.

21. The network device of claim 17, wherein the ranking of the other indexed item, further comprises employing a comparison of a current time of the selection of the indexed item and a time decay function associated with the other indexed items.

22. The network device of claim 17, wherein generating the data store for the user, further comprises:

examining at least one of a client device or a third-party service for the plurality of items, wherein the user is associated with the at least one client device and the at least one third-party service.

23. The network device of claim 17, wherein the relevancy between each of the plurality of items is based on at least one user behavior associated with the plurality of items.

24. A processor readable non-transitory storage media that includes instructions for managing items over a network, wherein the execution of the instructions by a processor enables actions, comprising:
   generating a data store for a user that includes at least a plurality of items associated with the user;
   determining at least one separate role of the user for each individual item in the plurality of items;
   determining a relevancy between each item of the plurality of items and each other item of the plurality of items;
   generating an index for the plurality of items based on at least the determined relevancies, wherein each indexed item includes an identifier to other indexed items that are relevant to a corresponding indexed item;
   for at least one indexed item, determining a ranking of the other indexed items that are relevant to the corresponding indexed item, wherein the at least one separate role of the user is employed to determine the ranking;
   in response to a selection of an indexed item, providing at least a subset of the ranked indexed items for the selected indexed item for display to the user, wherein the subset of ranked indexed items is determined based on the at least one role of the user for the selected indexed item; and
   displaying the selected index item in a preview pane to the user, wherein the preview pane includes one or more gleams that correspond to one of a plurality of categories for the plurality of items and also indicate a number of other ranked index items that are relevant to the selected indexed item.

25. The media of claim 24, further comprising:
   generating separate data stores and separate indexes of relevant indexed items for each of a plurality of users.

26. The media of claim 24, wherein the ranking of the other indexed items is based on at least a degree of relevancy that the other indexed items have to the corresponding indexed item.

27. The media of claim 24, wherein determining the ranking further comprises at least one of the following actions:
   for each indexed item, determining a ranked order of the other indexed items that are relevant to the corresponding indexed item independent of the selection of the indexed item; or
   employing the selection of the indexed item to determine the at least one indexed item, and determining another ranked order of the other indexed items that are relevant to the determined at least one indexed item.

28. The media of claim 24, wherein the ranking of the other indexed item, further comprises employing a comparison of a current time of the selection of the indexed item and a time decay function associated with the other indexed items.

29. The media of claim 24, wherein generating the data store for the user, further comprises:
   examining at least one of a client device or a third-party service for the plurality of items, wherein the user is associated with the at least one client device and the at least one third-party service.

30. The media of claim 24, wherein the relevancy between each of the plurality of items is based on at least one user behavior associated with the plurality of items.

\* \* \* \* \*